United States Patent [19]

Goodman

[11] Patent Number: 5,146,403
[45] Date of Patent: Sep. 8, 1992

[54] CHANGE OF ADDRESS SYSTEM AND METHOD OF USING SAME

[75] Inventor: Sidney R. Goodman, La Jolla, Calif.

[73] Assignee: Postal Buddy Corporation, San Diego, Calif.

[21] Appl. No.: 429,790

[22] Filed: Oct. 30, 1989

Related U.S. Application Data

[63] Continuation-in-part of Ser. No. 284,065, Dec. 13, 1988, Pat. No. 5,029,099, Ser. No. 428,864, Oct. 30, 1989, and Ser. No. 729,948, Jul. 15, 1991, which is a continuation of Ser. No. 429,658, Oct. 30, 1989, abandoned.

[51] Int. Cl.$^5$ .............................................. G06F 15/21
[52] U.S. Cl. ..................................... 364/401; 364/479
[58] Field of Search ....................... 364/401, 406, 479; 235/375

[56] References Cited

U.S. PATENT DOCUMENTS

| | | | |
|---|---|---|---|
| 4,567,359 | 1/1986 | Lockwood | 235/381 |
| 4,674,041 | 6/1987 | Lemon et al. | 364/401 |
| 4,970,655 | 11/1990 | Winn et al. | 364/479 |
| 5,007,084 | 4/1991 | Materna et al. | 235/379 X |

OTHER PUBLICATIONS

Patrier et al., *Commutation & Transmission*, No. 5, 1982, "Electronic Mail", pp. 21-30.
*PTS New Product Announcements*, Sep. 18, 1986, "Skyway Extends Online Electronic Mail Capabilities to Customers", p. 1 (abstract only).
*Business Marketing*, Nov. 1986, "Post office licenses new-address data base", p. 24. (abstract only).
*Business Week (Industrial Edition)*, Apr. 6, 1987, "Getting the Post Office to Update Your Mailing List" p. 102a.
*PTS New Product Announcements*, Aug. 20, 1990, "Cal. Dept. of Motor Vehicles Pioneers Self-Service Driver License Renewal Prototype with NCR", p. 1 (abstract only).
*San Diego Business Journal*, Dec. 16, 1990 "(Postal) Buddy, can you spare a change of address?" pp. 3, 24.

*Primary Examiner*—Dale M. Shaw
*Assistant Examiner*—David Huntley
*Attorney, Agent, or Firm*—Bernard L. Kleinke; Jerry R. Potts; William Patrick Waters

[57] ABSTRACT

A change of address system includes a group of change of address terminals or stations which are installed at a wide variety of diversified public locations, such as the postal service, shopping centers, food stores, and the like. The terminals receive and store customized change of address information by the user who is desiring to send notices to the postal service and other persons and companies, who send mail to the user. A service computer receives the change of address information from all of the terminals, and in response thereto, the postal service and others desiring the change of address information are notified, at least some of which on a bulk basis.

20 Claims, 27 Drawing Sheets

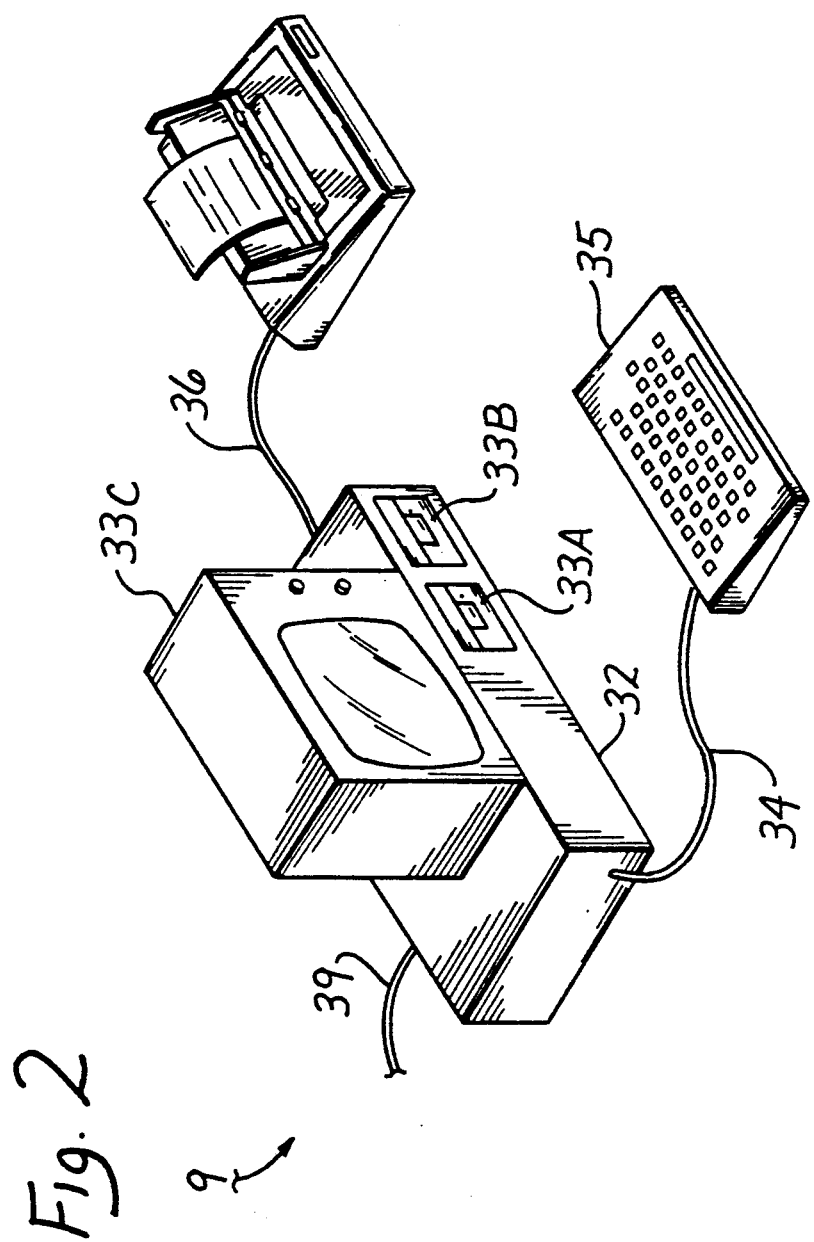

RECEIPT

Address Change

From: Sidney R. Goodman
4411 Moraga Blvd., Apt 103
San Diego, CA 92117-4328

To: Sidney R. Goodman
3583 Farmleigh Rd.
San Diego, CA 92106-8101

Receipt No. 10001-90-024-101
Page 1 Of 3 · Jan 24, 1990

Effective Date of Change: 01/01/90

You may re-visit Postal Buddy at any location to:
1.) Correct your address change or dates
2.) Notify more mailers
3.) Buy more Return Address Labels or Business Cards
4.) Buy more Change-of-Address Post Cards You will need your receipt number (above). If you cannot re-visit Postal Buddy, please call 1-800-P O BUDDY.

---

RECEIPT

Sidney R. Goodman

Receipt No. 10001-90-024-101
Page 2 Of 3 · Jan 24, 1990

The following have been notified of your Address Change:

Postmaster, San Diego 92117
Postmaster, San Diego 92101
Time
Fortune
Reader's Digest
Better Homes & Gardens
The Sharper Image
Williams Sonoma
American Medical Associates Saks Fifth Avenue
Bloomingdales
Book-of-the-Month Club
Columbia Record Club
United Mileage Plus
American AAdvantage
Hertz Notification has been sent to your Postmaster and all of the above correspondents.

---

RECEIPT

Sidney R. Goodman

Receipt No. 10001-90-024-101
Page 3 Of 3 · Jan 24, 1990

| Change-of-Address Post Cards | | |
|---|---|---|
| CATEGORY | | How Many? |
| Family | | 6 |
| Friends | | 5 |
| Church / Temple | | 2 |
| Doctor / Dentist | | 2 |
| Attorneys / Accountants | | 2 |
| Insurance Companies | | 1 |
| Bank Brokers | | 2 |
| Unions | | 2 |
| Clubs | | 3 |
| TOTAL BLANK CARDS | | 24 |
| Government Agencies | | 3 |
| Partially Adressed Cards | | 3 |
| TOTAL POST CARDS | | 43 |
| Cost per card (incl. Postage) | | $.30 |
| TOTAL COST/POST CARDS | | $12.66 |

| CHARGES | |
|---|---|
| CATEGORY | AMOUNT |
| 10 FREE Notifications | N/C |
| Return Address Labels | $5.33 |
| Change-of-Address Post Cards | 12.66 |
| Business Cards | 3.00 |
| TOTAL | $20.15 |
| Sales Tax @ 7% (s) | 1.02 |
| TOTAL CHARGES | $21.17 |

Paid in Full
American Express
Thank You!

(s) No sales tax on postage.

| Subscriber Name: Easy Publishing Co. |
|---|
| Subscriber Address: 123 Hope St., Downtown, Pa. 96123 |

SUMMARY REPORT

| CUSTOMER NAME | OLD ADDRESS | NEW ADDRESS | EFFECTIVE DATE |
|---|---|---|---|
| | | | |

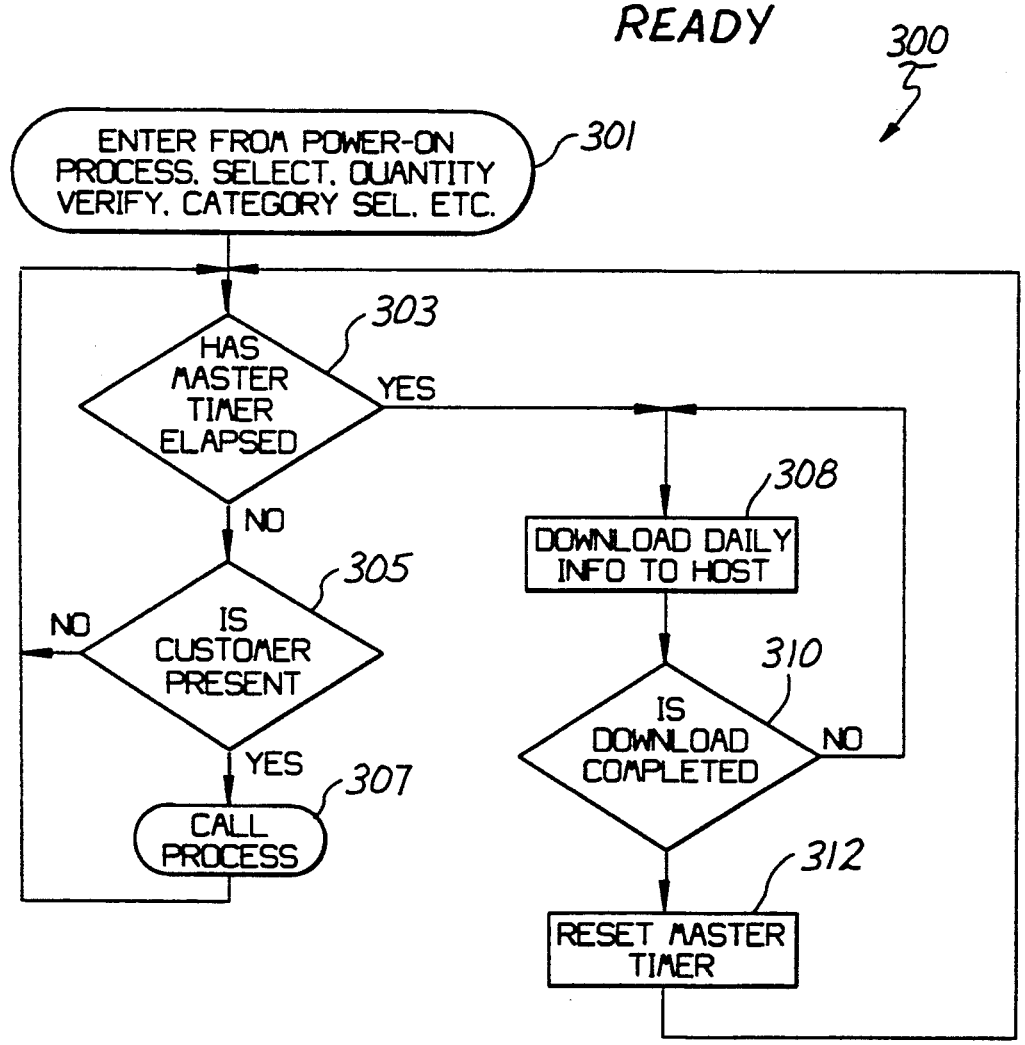

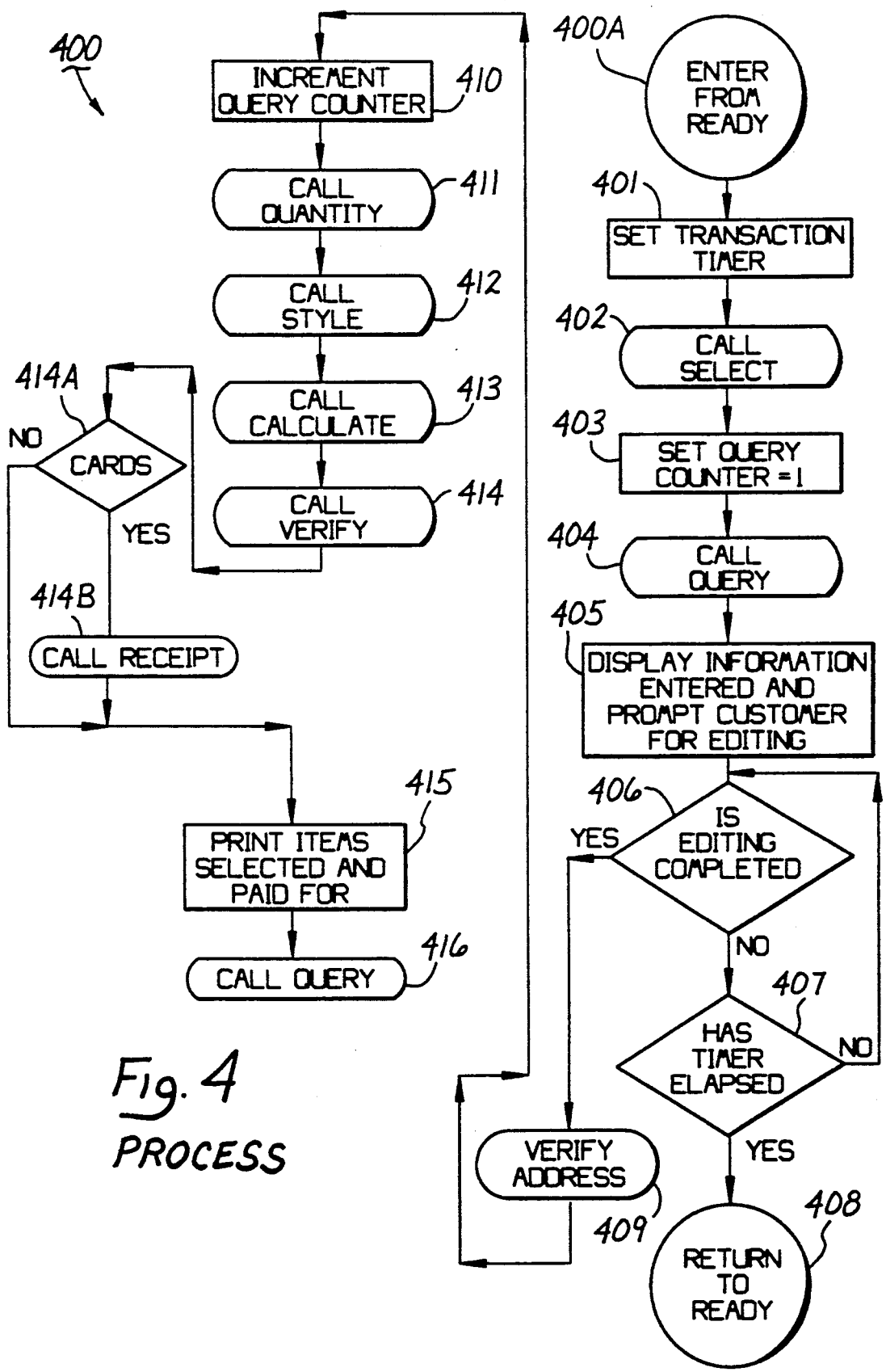
Fig. 4 PROCESS

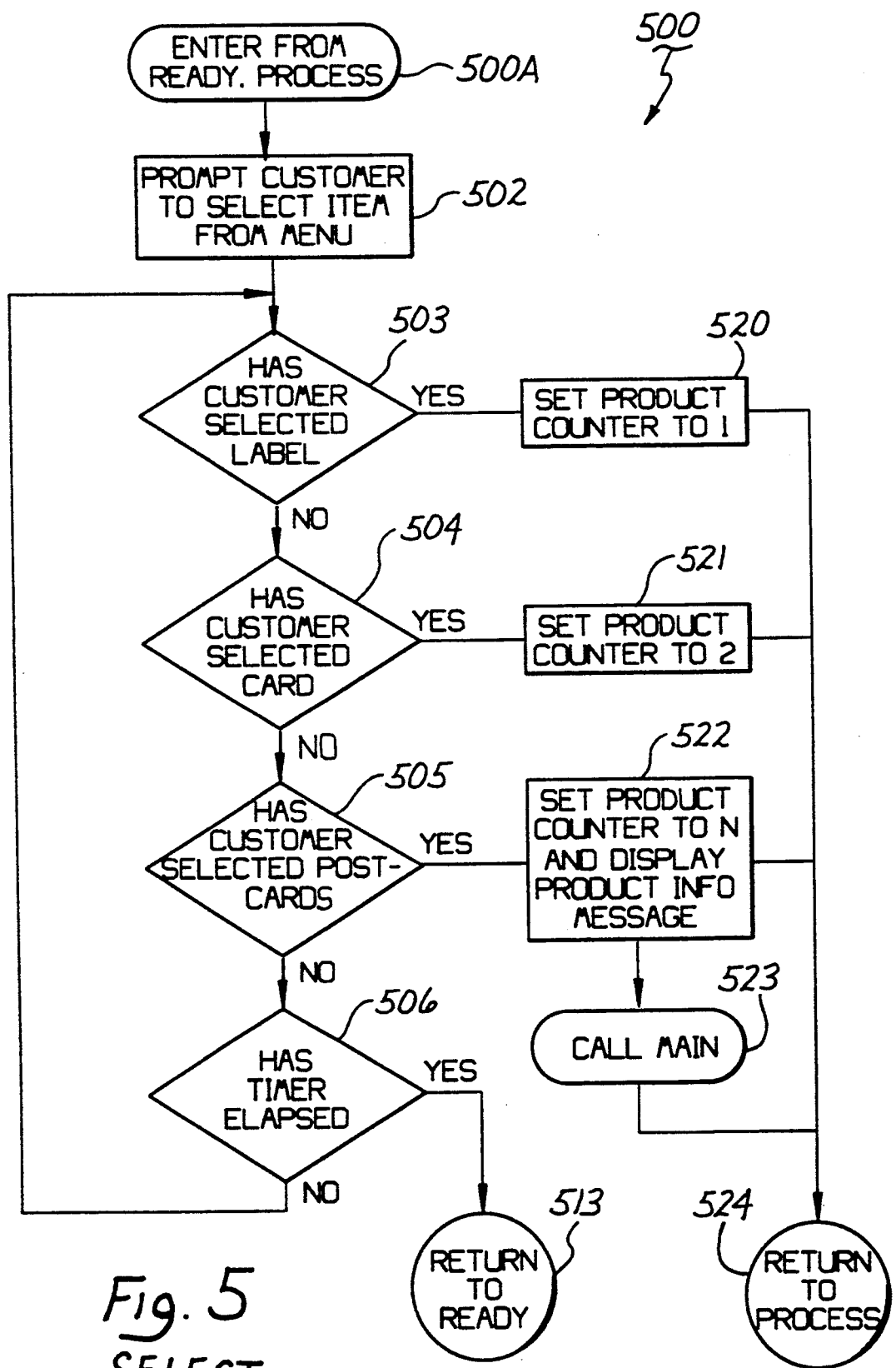
Fig. 5 SELECT

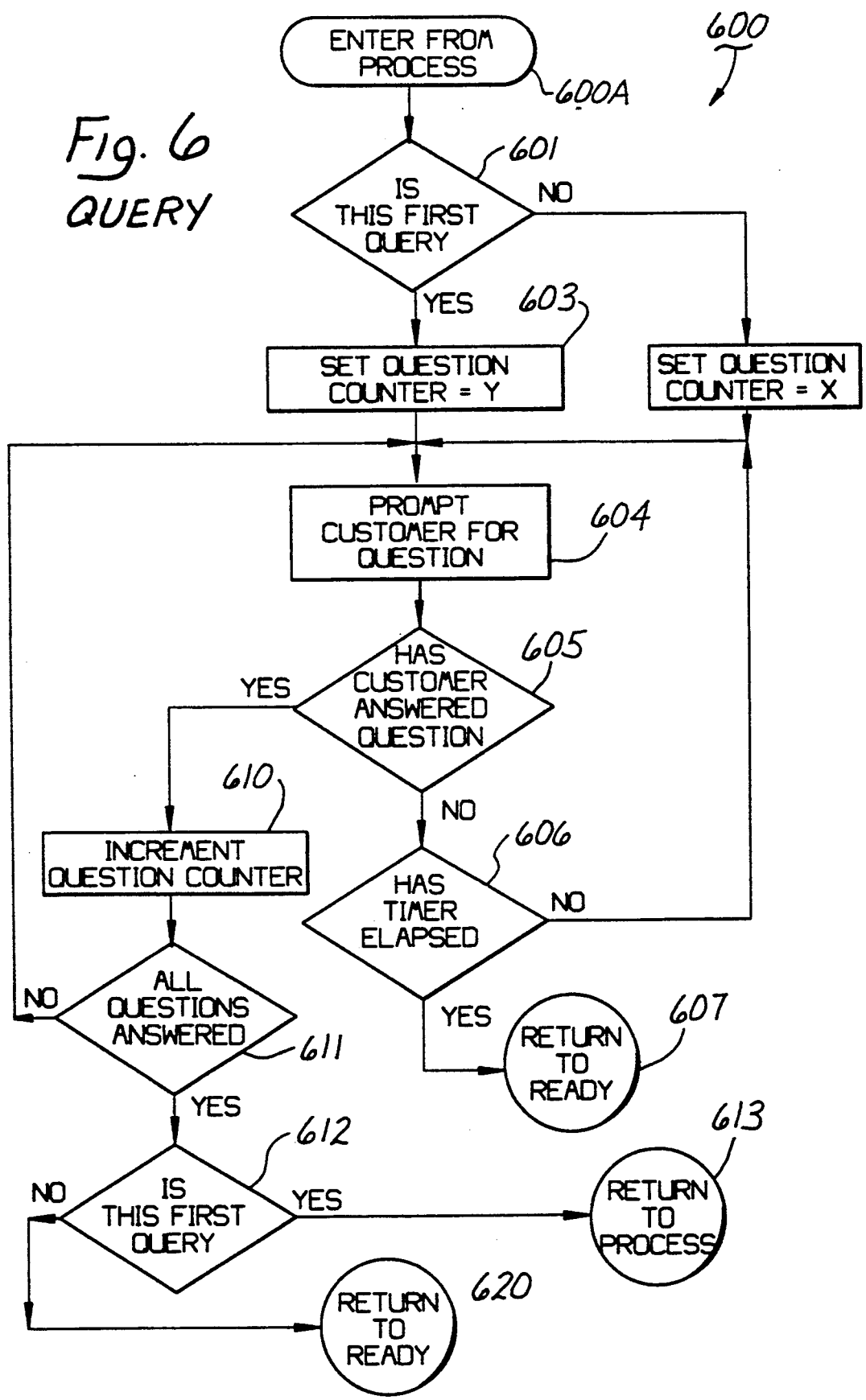

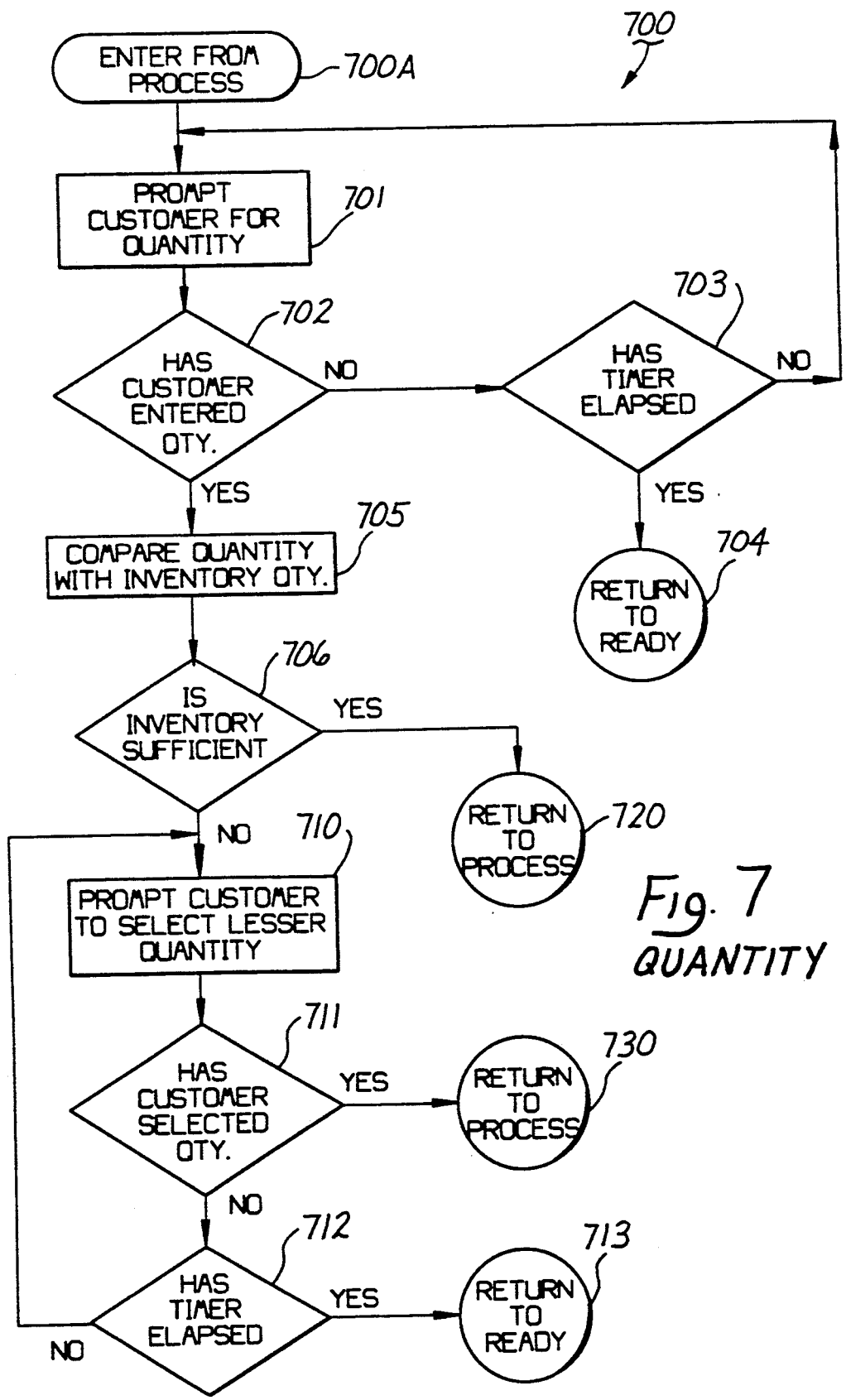

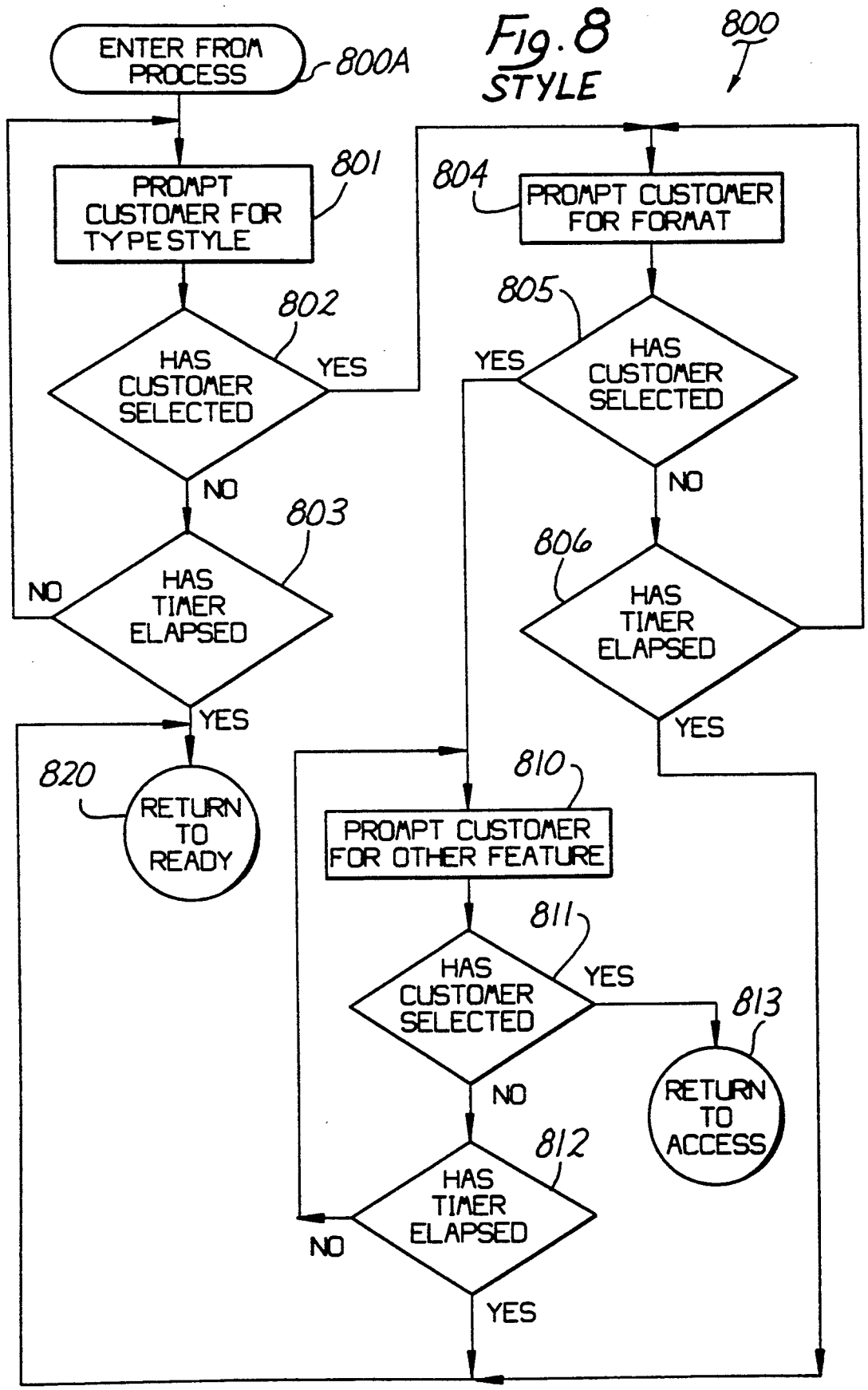

CALCULATE

MAIN

CATEGORY SELECTION

CATEGORY SELECTION

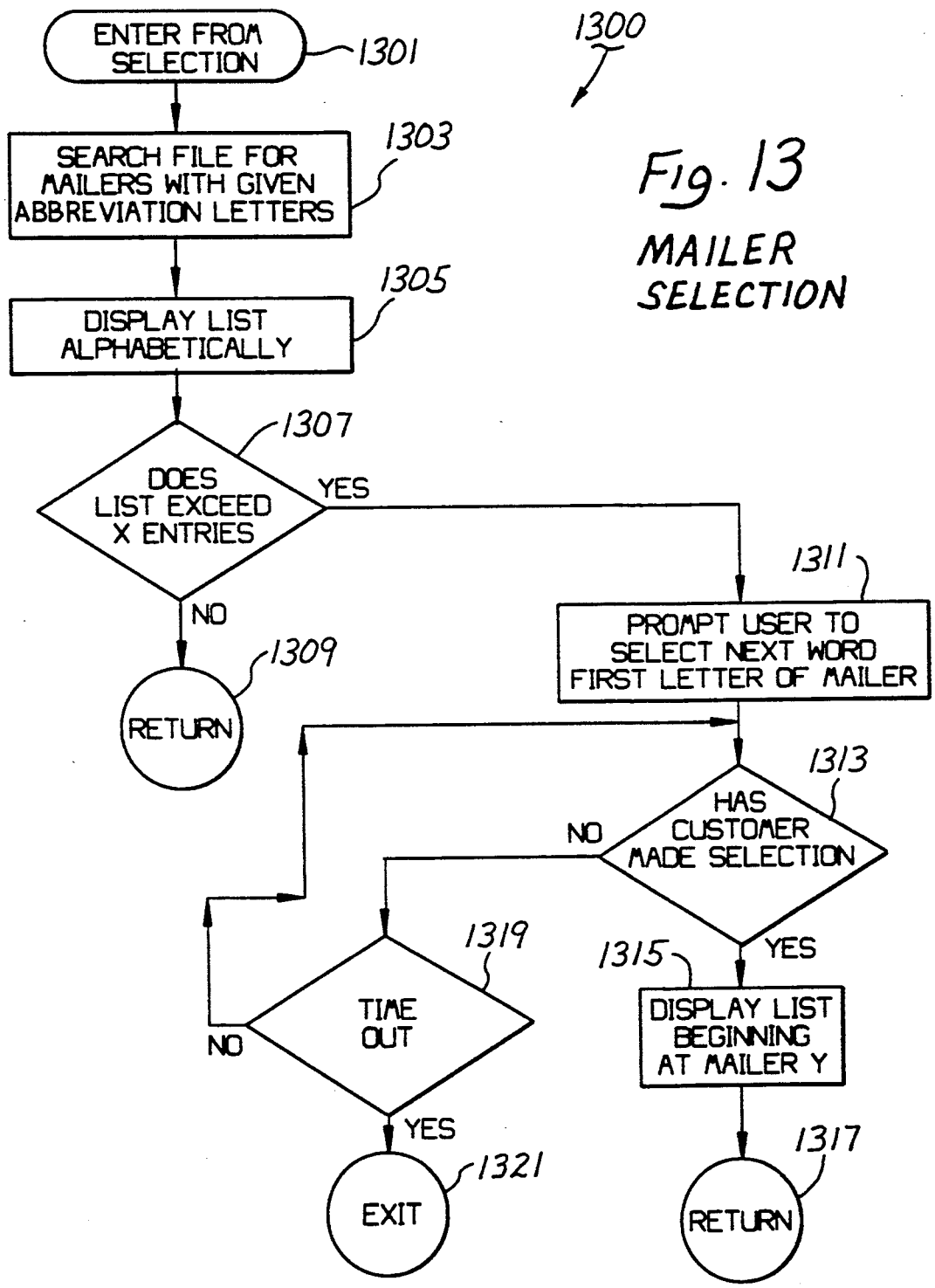

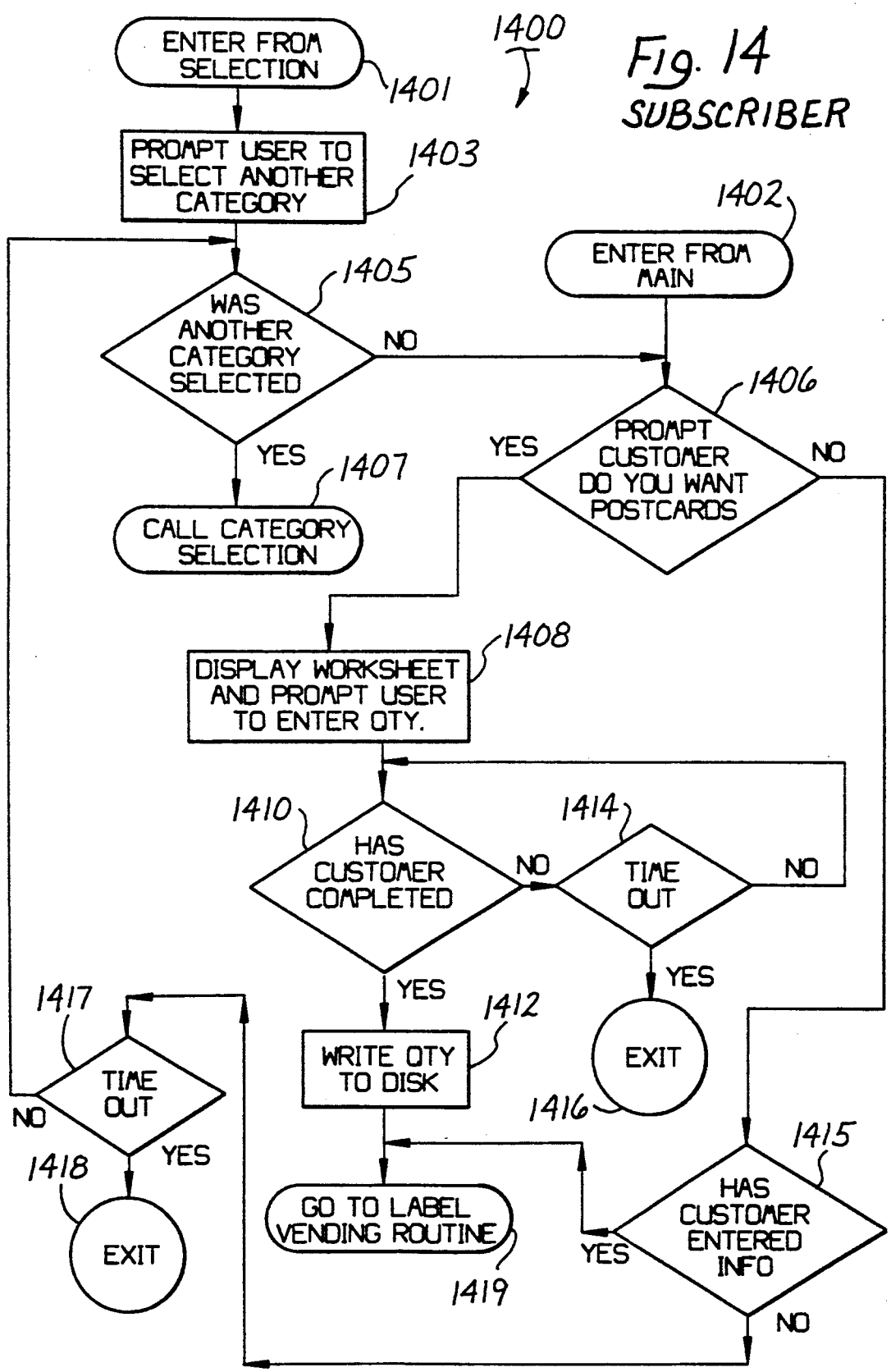
Fig. 14 SUBSCRIBER

NON-SUBSCRIBER

VERIFY ADDRESS

RECEIPT

CREDIT CARD

5,146,403

CHANGE OF ADDRESS SYSTEM AND METHOD OF USING SAME

CROSS REFERENCE TO RELATED APPLICATIONS

This patent application is a continuation-in-part of U.S. Pat. application, Ser. No. 07/284,065, filed Dec. 13, 1988, now U.S. Pat. No. 5,029,099 U.S. Pat. application Ser. No. 07/428,864, filed Oct. 30, 1989, entitle "DOCUMENT DISPENSING APPARATUS AND METHOD OF USING SAME, " U.S. Pat. application Ser. No. 07/729,948 filed Jul. 15, 1991, entitled "FOREIGN CHARACTER TERMINAL AND METHOD OF USING SAME," which is a continuation of U.S. Pat. application Ser. No. 07/429,658, now abandoned, filed Oct. 30, 1989, entitled "FOREIGN CHARACTER TERMINAL AND METHOD OF USING SAME," said applications being incorporated herein by reference.

1. Technical Field

This invention relates in general to a change of address system and method of using it, and the invention more particularly relates to a self-service system for notifying mail distributors such as the U.S. Postal Service, large magazine publishers and the like, of the mailing address change for a given individual or business entity.

2. Background Art

There have been various different techniques for individuals or companies, to notify their change in address to the U.S. Postal Service, as well as to various mailers including individuals and business entities who send mail to them on a regular basis. While such techniques have been generally satisfactory, there have been many examples of added costs to the U.S. Postal Service, as well as the various mailers Such mailers include large magazine publishers, who have experienced unwanted and costly delays associated with having misaddressed mail being returned, or at least delayed, in delivery. Also, the customers, who have changed their addresses, are inconvenienced by the loss or delay in their mail.

Therefore, it would be highly desirable to have a new and improved change of address system and method of using the system, to enable change of address notices to be more efficiently and effectively communicated and processed, to avoid, to a large extent, such unwanted and costly delays in the delivery of mail.

One of the many problems associated with conventional change of address techniques, is the cost associated with notifying individuals and companies of the new address. In this regard, individual change of address cards must be prepared and mailed to the regular mailers. Such new address information, and the like, is entered manually, by postal service personnel in postal service equipment. Such large scale operations is very costly, and is time consuming. Furthermore, the entries may introduce unwanted and unintended errors, which result in delays or misdeliveries.

Therefore it would be highly desirable to have a new and improved change of address system, to improve greatly the method of notifying mailers, in a more efficient and cost effective manner. For example, such a system should be able to avoid the undesired delay associated with the large mail distributors, such as large magazine publishers, each processing huge numbers of change of address notices each day. Such processing also requires entry of the change of address, and such entry of information is costly to the mail distributor, and is subject to errors. Such errors also contribute to delayed and misdelivered mail.

Another problem with the conventional change of address system, is that errors can be introduced by the sender of the notice. In this regard, the person filling out the conventional change of address notice for the postal service, or for the mailers, may make errors in such entries. A common error is in the ZIP code for either the old address, or the new address Such an inadvertent mistake, can also compound the delays, or loss of delivery, associated with the conventional system, as it now exists.

Thus, it would be highly desirable to eliminate, or at least greatly reduce the delays associated with the conventional change of address system. Also, errors in entries should be minimized, or at least greatly reduced.

DISCLOSURE OF INVENTION

Therefore, it is the principal object of the present invention to provide a new and improved system and method of communicating change of address notices, in a more effective and efficient manner.

Another object of the present invention is to provide such a new and improved change of address system and method of using it, to help reduce redundances and possible errors in entries, to achieve a more accurate notification system.

Briefly, the above and further objects of the present invention are realized by providing a new and improved system and method for enabling a user to communicate change of address notices in an effective and relatively efficient manner, while being cost effective.

A change of address system includes a group of change of address terminals or stations which are installed at a wide variety of diversified public locations, such as the postal service, shopping centers, food stores, and the like. The terminals receive and store customized change of address information by the user who is desiring to send notices to the postal service and other persons and companies, who send mail to the user. A service computer receives the change of address information from all of the terminals, and in response thereto, the postal service and others desiring the change of address information are notified, at least some of which on a bulk basis.

Thus, the system and method of the present invention encourages persons desiring to send change of address notices to enter them in a conveniently located terminal. They no longer are required to find change of address forms, fill them out by hand, and then mail them. All of these actions contribute to the person delaying in the sending of the notices.

Instead, the inventive system and method encourages and facilitates the easy entry of the information, since the terminals will be located in many different convenient locations where the person is likely to go and have ready access to use the terminal.

Furthermore, since the person enters the information himself, or herself, such entry need not be duplicated by the postal service, or by the others to receive the notices. In this regard, once the information is entered and verified by the user, the service computer receiving the information from the terminals, can communicate directly with the postal service computers, and other computer, to download batch information, which may be pre-sorted. Thus, each person or entity receiving the information, need not re-enter the information. Thus, far greater accuracy and speed of dissemination of the change of address information is achieved.

The system further includes a device generates and supplies cost information to the customer for preparing the customized documents and notifying selected mail distributor of the change of mailing address for the customer. Responsive to signals indicative of the correct payment corresponding to the cost information being received, a device produces customized change of address summary change of address reports, change of address postcards, and other customized documents for the customer's use to notify the postal service, publication mailers and other individuals and companies of the change in their mailing address.

In the preferred form of the invention, the system is used to produce change of address information for the U.S. Postal Service, large mail distributors such as publication mailers, and to vend change of address postcards for other individuals and companies who send mail to the user on a regular and periodic basis In such an arrangement, there is provided a plurality of self service change of address terminals, where each terminal includes a data processing computer, a credit card acceptor mechanism, a bill and coin acceptor mechanism, a video display for displaying sales and inquire information to the customers, and a postcard printer dispensing mechanism to furnish the customer with authorization forms and change of address postcards for mailing to companies and other persons who the customer has indicated as needing to be notified of the change in the mailing address of the customer.

The change of address terminals are located at various convenient locations and are all coupled to a master service computer which receives periodic customer information reports from the individual terminals for the purpose of preparing a summary report which may be transmitted to a designated mailer in a compiled report manner.

In its operation, the system carries out the following steps for producing and vending the change of address postcards and for notifying publication; mailers and U.S. postal authorities of the change in the mailing address of the customer:

1. Queries from a customer are accepted by the self service change of address terminal as to which persons and companies the customer desires to notify of the change in the customer's address;

2. The terminal solicits any necessary information from the customer in order to answer the queries;

3. Customer information and queries are transmitted to the data processing computer;

4. Relevant data are transmitted from the data processing computer regarding services, processed and transmitted to the video terminal for responding to the customer;

5. If the customer elects to make a purchase of change of address postcards and other customized documents, such as mailing labels, in response to the data received, the system receives the customer's monetary remittance either in cash or by credit card, and returns the required change, if any, to the customer; and 6. On receipt of the appropriate monetary remittance, whether by cash or credit card, the requested change of address postcards and other customized documents are dispensed to the customer.

The master service computer contains information on the postal service, as well as various publishers, associations, colleges, banks, credit cards, books, record clubs, etc. This information, on an as needed basis is transmitted to and stored by the change of address terminal computer for use by a customer. Certain of the above mentioned entities may subscribe to be automatically notified by the owner of the system in the event one of their members, students or customers changes a mailing address. Those who have requested to be automatically notified are called subscribers, while those who have not requested such automatic notification are called non-subscribers. Included in this later category are such entities as family members, friends, doctors, attorneys, unions, etc.

The inventive terminal is programmed to elicit from the customer the information necessary to provide a quotation for notifying the different customer selected entities of the change of address. In this regard, the this regard, the customer is charged different rates for notifying subscribing entities of a change of address as opposed to notifying non-subscribing entities. After the customer selects the manner in which to notify the non-subscribing entities, the terminal accepts either the customer's credit card or money, and returns and required change and dispenses if requested customized postcards and other customized documents with the change of address information disposed thereon. The change of address also terminal at the end of a fixed time period, downloads the customer/subscriber information entered by the customer to the remotely located master service computer so the information may be distributed to the appropriate subscribing entities, such as the postal service.

The system saves considerable money and time for both the customer and the subscribing entities. In this regard, the customer is not required to call or send change of address information to the subscribing entities in order to notify them of a changed mailing address. Similarly, the system produces at the customer's request a multiple number of customized change of address postcards which minimize the time and effort expended by the customer in preparing notification cards for delivery to his or her mailers.

The subscribers in a like manner also benefit. For example, subscribers do not incur unnecessary postage expenses in having their publications forwarded to a customer who has moved. Moreover, the subscriber is able to maintain constant contact with the customer because of being informed of the customer's changed address.

The data processing computer at the change of address terminal stores information on the subscribers and prices for postcards, mailing label and other customized documents which might be requested and dispensed. This processing unit is also programmed to gather a predetermined sequence of information from a customer on the entities to be notified and the customized documents (postcards, labels, etc.) that the customer desires. The information entered and gathered at the terminal is processed and transmitted via a video monitor to display quotation and other pertinent information to the customer that enables the terminal to process the change of address request initiated by the customer.

Subsequently, the terminal downloads its gathered customer information to the master service computer to notify subscribing entities and selected companies and individuals of the user's change of address and to accept an order from the user for the offered services, postcards and other customized documents, to collect payment, either by credit card or cash, and to vend the requested materials to the customer.

Thus, a customer is asked pertinent questions on the names of subscribing entities to be notified and the names and addresses of the non-subscribing entities, the customer's old and new address and other pertinent information necessary to process a quotation for the type of postcards, labels, etc., if any, the customer has selected. The gathered information is sent to the terminal computer where the quotation is processed and transmitted back to the video monitor The customer is then given an opportunity to purchase the selected items. If a set of postcards, mailing labels, etc. are desired, the system accepts the customer's payment, verifies the correct amount has been received, returns any necessary change, and prints and vends the requested change of address postcards, mailing labels, etc. with the information provided by the customer. The system also at regular time intervals, downloads the computer to a remote central processing station to distribute the change of address information in both the various subscribing entities.

In view of the foregoing, the system of the present invention enables customized change of address records to be prepared and distributed to subscribing entities and to vend change of address postcards, mailing labels, etc. for the customer's use. Since the change of address system can easily determine whether a given entity is a subscribing or non-subscribing entity and since the documents produced are customized according to fixed parameters, the notification process and prepared documents can be accounted for and are thus, charged to the customer in a fast, convenient, self service mode of operation.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 2 is a pictorial, partially diagrammatic view of the master service computer of FIG. 1;

FIGS. 2E-2I are face plan views of the customized change of address postcards and notification information documents prepared for a customer as generated by the change of address terminal of FIG., 2A; and FIGS. 3-11, 12A, 12B and 13-18 are flow charts of software computer programs stored in the personal computer of FIG. 2A.

BEST MODE FOR CARRYING OUT THE INVENTION

The following description is presented and organized according to the following outline:
A. HARDWARE DESCRIPTION
B. SYSTEM OPERATION
C. SYSTEM COMPUTER SOFTWARE
D. CUSTOMIZED DOCUMENTS

A. HARDWARE DESCRIPTION

Figure 1:
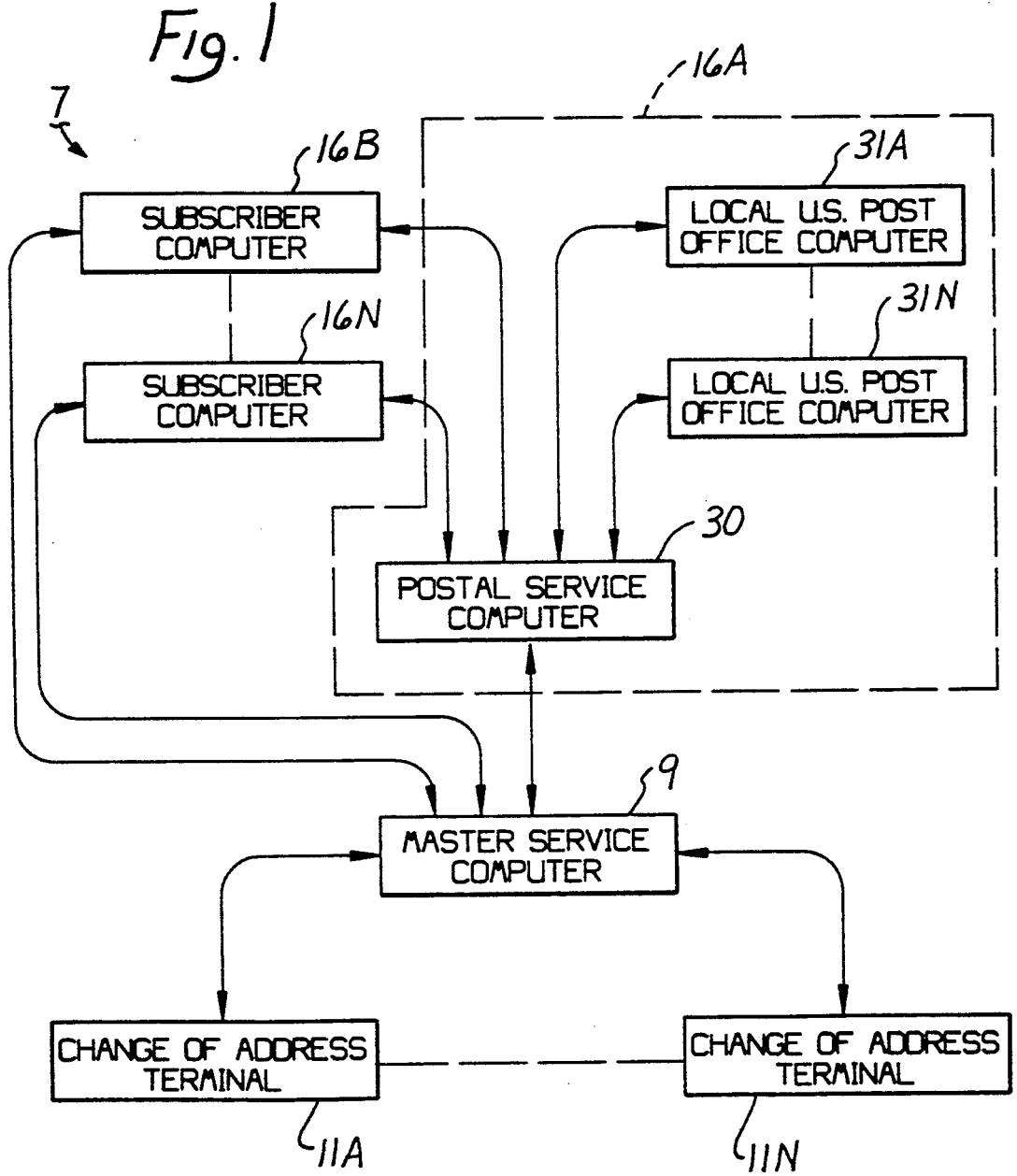
FIG. 1 is a block diagram of the change of address system according to the present invention.

Referring now to FIG. 1 of the drawings, there is shown a computerized change of address system 7, which is constructed in accordance with the present invention and which is adapted to produce and to vend customized change of address postcards to a customer (not shown) and to notify various subscriber entities such as the U.S. Postal Service and magazine publishers of the customer's address change.

The system 7 generally comprises a master service computer 9, which communicates individually and selectively with each one of a large group of change of address terminals 11A-11N. The terminals are each disposed in a variety of widely distributed geographic locations, such as the postal services, shopping centers, grocery stores, and others. In this manner, the customers can enter their change of address information, at many different convenient locations.

The master service computer 9 performs all the necessary basic distributions of change of address information, and communicates with the change of address terminals 11A-11N each of which includes a personal computer CPU that performs all the necessary basic calculations for producing and vending customized change of address postcards, notifying subscriber mailers such as the government postal service, magazine publishers and the like, as well as, non-subscribing mailers which a customer may desire to notify of a change of address. The change of address terminals such as terminals 11A-11N may be located at a variety of convenient locations such as at post offices, shopping malls, and other convenient places of business In this manner, a customer may easily and conveniently notify any number of entities of a change in his or her address in an easy and convenient manner.

The system 7 also includes a group of subscriber computers 16A-16N, which communicate individually and selectively with the master service computer 9. In this regard, there can be any number of such subscriber computers, and each one is utilized by a separate publisher or other subscriber mailer such; as the postal service for cooperating with the master service computer 9 for expediting and receiving change of address information regarding the customers of the subscriber computer entities or those individuals and companies which the subscriber may service. For example, once a customer decides to change his mailing address, the master service computer 9 may communicate directly with the postal service via a master service computer such as service computer 30. In this regard, the postal service computer 30 may communicate with one or more of a group of individual postal service computers 31A-31N to notify local postal authorities of the change in a customer's address for which they are responsible.

As shown in FIG. 2, the master service computer 9 is shown pictorially. The master service computer 9 generally comprises a computer processor 32 having a pair of disk drive memories 33A and 33B and a video monitor 33C. The processor 32 also includes a cable 34 which interconnects the processor 31 with an input keyboard 35. A cable 36 interconnects the computer processor 31 and a printer 38. A cable 39 interconnects the service computer processor 31 with the other components of the system 7 such as the subscriber computers 16A-16N and the change of address terminals 11A-11N.

Considering now the inventive change of address notification system 7, in greater detail with reference to FIG. 1, the system 7 generally includes a self service sales and information terminal, such as terminal 11A, which includes a housing 11 for enclosing a personal computer CPU 12 and a modem 24 for communicating telephonically over telephone wires (not shown) The personal computer CPU 12 is an IBM PS-2 model M25 or equivalent, and includes a video subsystem 15, a keyboard 17 and a storage media unit 23. The video subsystem 15 includes a conventional video monitor 29. The video subsystem 15 is manufactured by IBM for use with the IBM PC-AT compatible personal computers.

The keyboard 17 is a customized keyboard for use with the IBM PC-AT type personal computer and is described in greater detail in copending U.S. Pat. application Ser. No. 07/428,864, filed on Oct. 30, 1989. The personal computer CPU 12 is connected to an interface unit 13 for enabling a customer user of the system to solicit sales information and to purchase various types of printed documents in the form of change of address postcards and customized mailing labels, and other similar documents. The sales and information terminal 11 is installed at various convenient locations, such as post offices, shopping malls, and so on.

The terminal such as terminal 11A is designed to provide the same level of service as would a well informed sales representative and to interface with the customer by means of the communications and peripheral communication subsystem 14.

The interface unit 13 is also connected to the system peripherals that include a bill/coin acceptor 18, a printer 19, a credit card acceptor 21, a card dispenser 22, and a customer actuation switch 20.

The interface unit 13 enables the personal computer CPU 12 to sense the activation of a customer actuation switch 20 and to coordinate the operation of the bill-/coin acceptor 18 and credit card acceptor 21 with the other peripheral units of the terminal 11A.

The bill/coin acceptor 18 includes a Mars Electronics model TRC 6000 coin acceptor, and a model L020-U4C bill acceptor. The printer 19 is a Hewlett Packard Laser Jet model 11PD or the equivalent.

Figure 2A:
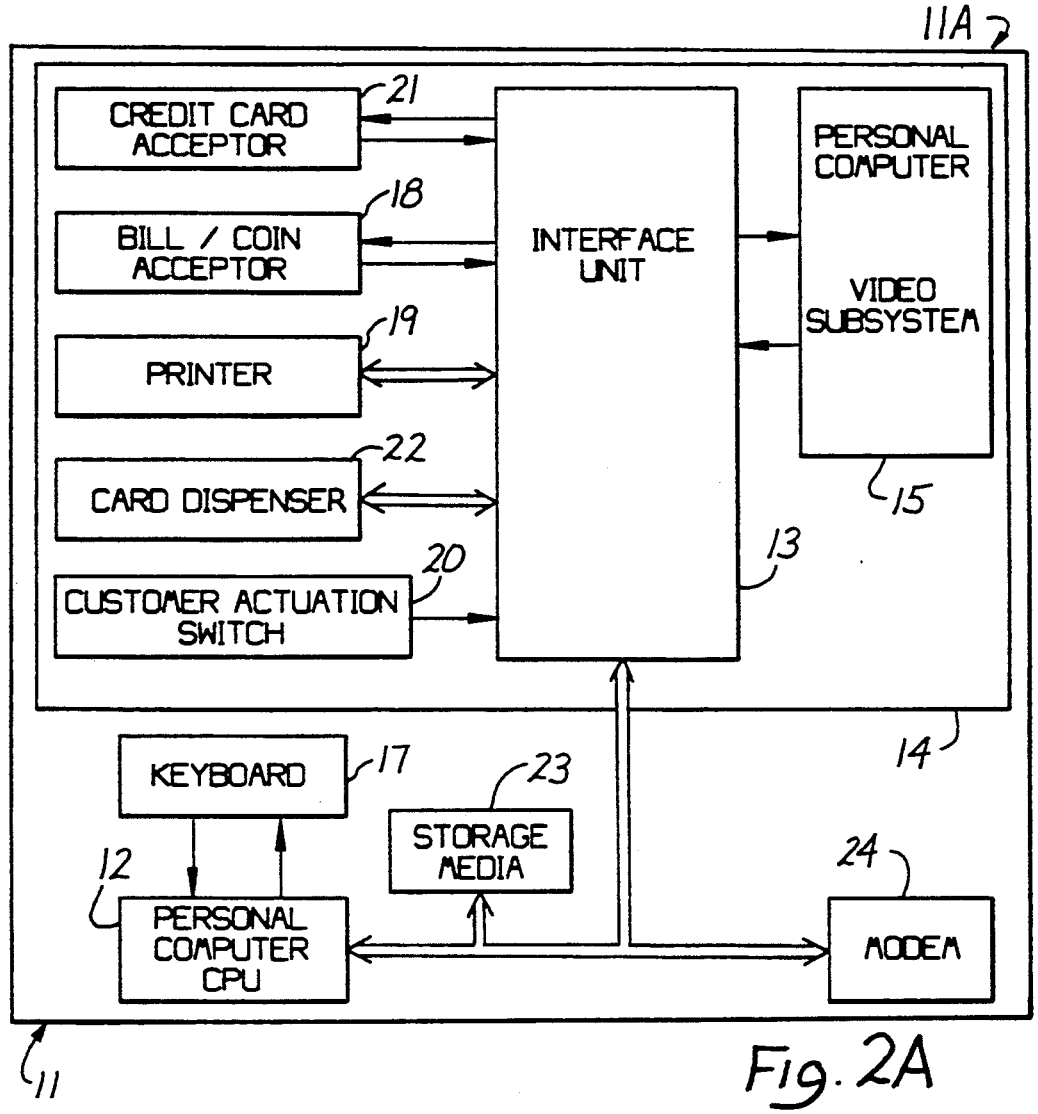
FIG. 2A is a block diagram of the change of address terminal of FIG. 1.

Considering now the interface unit 13 in greater detail with reference to FIG. 2A, the interface unit 13 links the various peripheral units with the personal computer CPU 12. In this manner, the personal computer CPU 12 is able to coordinate the operation of the bill/coin acceptor 18 and the credit card acceptor 21 with the other peripheral units of the system. The interface unit 13 includes a conventional communication subsystem RS-232 serial circuit (not shown) for converting the signals received from the con/bill acceptor 18 and the credit card acceptor 21 so that they are acceptable to the personal computer CPU 12. The interface unit 13 also converts the bill/coin acceptor 18 signals and the credit card acceptor 21 signals into proper formatting for processing by the personal computer CPU 12, such as ASCII format The interface unit 13 of the peripheral communication subsystem 14 is programmed to detect the presence of a prospective customer via the actuation device 20. When the actuation device 20 of the terminal 11 is activated, a customer detection signal is transmitted via the interface unit 13 to the video subsystem 15, which operates to commence playing a pre-arranged video presentation..

Figure 2B:
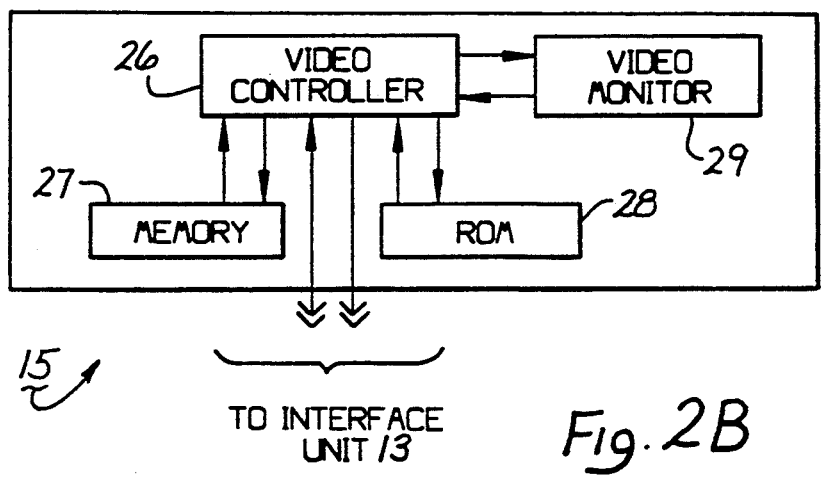
FIG. 2B is a block diagram of the video subsystem of FIG. 2A.

Considering now the video subsystem 15 in greater detail with reference to FIG. 2B, the video subsystem 15 basically comprises a video controller 26 associated with a memory 27 for controlling the operation of the video subsystem 15, a read only memory or software unit 28, and a video monitor 29. The video subsystem 15 is connected to the interface unit 13 so that the operation of the video subsystem 15 presentation may be coordinated with the operation of the bill and coin acceptor 18, the credit card acceptor 21, the printer 19, and the card dispenser 22.

Considering now the operation of the video subsystem 15 in greater detail with reference to FIGS. 2A and 2B, the video subsystem 15, via the personal computer CPU 12, commences the preprogrammed video presentation stored in the storage unit 23. Once the interface unit B transmits a customer detection signal to the personal computer CPU 12. The video presentation then solicits and allows the customer to enter information at various points via the keyboard terminal 17 and messages are displayed on the monitor screen 29.

The personal computer CPU 12, processes the information it receives from the interface unit 13 and sends information back via the interface unit 13 to the video subsystem 15. Information received back from the data processing personal computer CPU 12, for example, includes a customized document quotation, a non-mailer and subscriber quotation, and other quotation data which is displayed on the monitor 29.

The video subsystem 15 via the personal; computer CPU 12 then continues the presentation asking the customer whether or not he or she wishes to make a purchase. If a purchase order is entered, the customer places an appropriate amount of money comprised of bill and coins in the bill and coin mechanism 18 or inserts a credit card into the credit card acceptor 21. The type of money inserted in the bill and coin mechanism is transmitted to the data processing computer 12 via the interface unit 13. Similarly, the credit card, if it includes a magnetic strip, is read by the credit card acceptor 21, and the information likewise is transmitted back to the personal computer CPU 12 via the interface unit 13.

The personal computer CPU 12 upon receipt of the type of money received either calculates the amount of money inserted into the bill and coin mechanism 28 to determine whether an appropriate amount of money has been remitted by the customer or via the modem 24 verifies that the credit card that was inserted into the credit card acceptor 21 is valid and is authorization to charge the amount of the transaction that the customer has requested. If an inappropriate amount of money has been received or an insufficient amount of money has been received or if the credit card is not authorized, the personal computer 12 transmits a signal that causes the video monitor 29 to display a message requesting that a correct amount of money be inserted into the bill and coin mechanism 18, and/or that the transaction cannot be completed by the credit card which has been inserted by the customer. Upon receipt of an appropriate amount of money, the requested change of address postcards, mailing labels, or other customized documents are vended via the label printer 19 and the card dispenser 22.

Considering now the operation of the terminal IIA in greater detail, in connection with the following description of the software residing in the personal computer 12 and in the video subsystem 15 with reference to FIGS. 3–18, the customer upon actuating the terminal actuation device 20, is confronted with a series of messages which appear on the video screen 29, solicits data, displays answers, and gives instructions about the use of the system, and generally creates the impression of dealing with a live person. These operations are under the master control of the personal computer 12.

The data processing personal computer CPU 12 includes the storage unit 23 for storing program information and information on subscriber mailers, labels and prices for various types of quantities of labels and notification charges for notifying non-subscriber mailers as will be described hereinafter in greater detail. The data processing personal computer CPU 12 operates in response to program instructions to: (1) perform change of address quotation calculations in response to customer information received from the foreign character terminal 17; (2) to send quotation data to the interface unit 13 so that the video controller 26 will display such data on the video monitor 29; and (3) to receive monetary information from the bill and coin acceptor 18 or credit card approval from the credit card acceptor 21 for payment approval or disapproval.

If a customer makes a purchase order after inserting the proper amount of money, or after inserting an approved credit card, the data processing personal computer CPU 12 stores the customer information and sends instructions to the card dispenser 22 and to the printer 19 to print an appropriate amount of change of address post cards and/or mailing labels as requested by the customer.

SYSTEM OPERATION

In operation, the first phase of operation of the system 7 comprises a basic fact gathering process performed under the control of a computer program executed by a change of address terminal, such as change of address terminal 11A as shown in FIGS. 1 and 2A. The fact gathering process is performed at a convenient locale where various individuals may easily have access to the terminal 11A. The information is gathered in response to computer generated images, referred to at screens, displayed by a video subsystem 15 associated with the change of address terminal 11A as will be described hereinafter in greater detail. The computer program for causing the generation of the screens, is preferably stored on a storage media device, such as storage media device 23, which is also used to store basic customer data. Once the basic customer data is entered into the change of address terminal personal computer 12 by the customer, such information is stored in the storage media 23 and then sent to the master service computer 19 for compiling and distribution to the various subscribing entity computers, such as computers 16A–16N. It should be understood the basic information, once gathered at the terminal 11A, can be sent to the service computer 9 by various other techniques,; such as by sending electronic messages, via modems, such as modem 24 and telephone lines.

The basic customer information gathered at terminal 11A includes the name and address of the customer who is changing their mailing address, and a list of the various subscriber mailers to whom which the customer desires to be notified of the change in his or her mailing address.

Once the basic customer information is gathered, the change of address terminal, such as terminal 11A, will periodically on a predetermined time basis, download its information to the master service computer 9. At this point, the second phase of the operation commences. The second phase is the notification process phase. As part of this second phase of operation, a change of address report 299 as shown in FIG. 2I is generated. The document includes summarized information. Such information includes the name and address of the customer that has requested change of address information be supplied to a subscriber along with the old and new addresses of such customer and an effective date for the address change. In this manner, a subscriber mailer can receive a single summarize report which lists a number of customers, clients, etc. who are changing their mailing address.

C. SYSTEM COMPUTER SOFTWARE

The various programs for carrying out the operations of terminal 11 are of a "menu type" and can best be understood with reference to the flowchart diagrams of FIGS. 2D and 3–18. FIGS. 2D and 3–18 show the sequence of operations carried out at the change of address sales terminal 11A by the data processing personal computer 12 in response to input from the keyboard terminal 17.

The sequence of operations basically comprise the following steps:

1. terminal waits detection of a customer;
2. terminal is activated by the customer;
3. information gathering message displayed;
4. customer enters name of mailers to be notified of address change;
5. customer entered information displayed on monitor for editing and correction by customer where appropriate;
6. customer makes corrections if any;
7. change of address information stored by data processing personal computer;
8. data processing personal computer forms change of address quotation calculations for selected identified entities and relays the information back to the video terminal;
9. quotation information given to customer on monitor screen;
10. customer asked if he or she wishes to notify non-subscribing entities;
11. customer asked if notification is to be by printed postcard or by report send from central location;
12. customer asked if he or she wishes to make purchase of additional change of address postcards;
13. if customer wishes to make purchase, customer is prompted for quantity of change of address cards to be printed;
14. customer is prompted whether he or she desires to purchase optional items such as mailing labels, etc.
15. if customer wishes to purchase labels or other special items, system gathers additional information from customer and prepares special quotation calculations.
16. customer asked if he or she wishes to purchase special items at quoted prices; 17. if customer wishes to purchase special items, including notifying non-subscribing entities customer is asked to make payment; 18. payment is received and signal is sent to data processing personal computer center indicative of amount received; 19. the data processing personal computer determines whether proper payment has been received and if change is required or a different monetary bill is required. 20. if additional money is required or if a different bill is required the correcting information is communicated to the terminal and displayed to the customer; and 21. if proper payment is made, the order is taken and all special items are issued to the customer at the terminal.

Figure 2C:
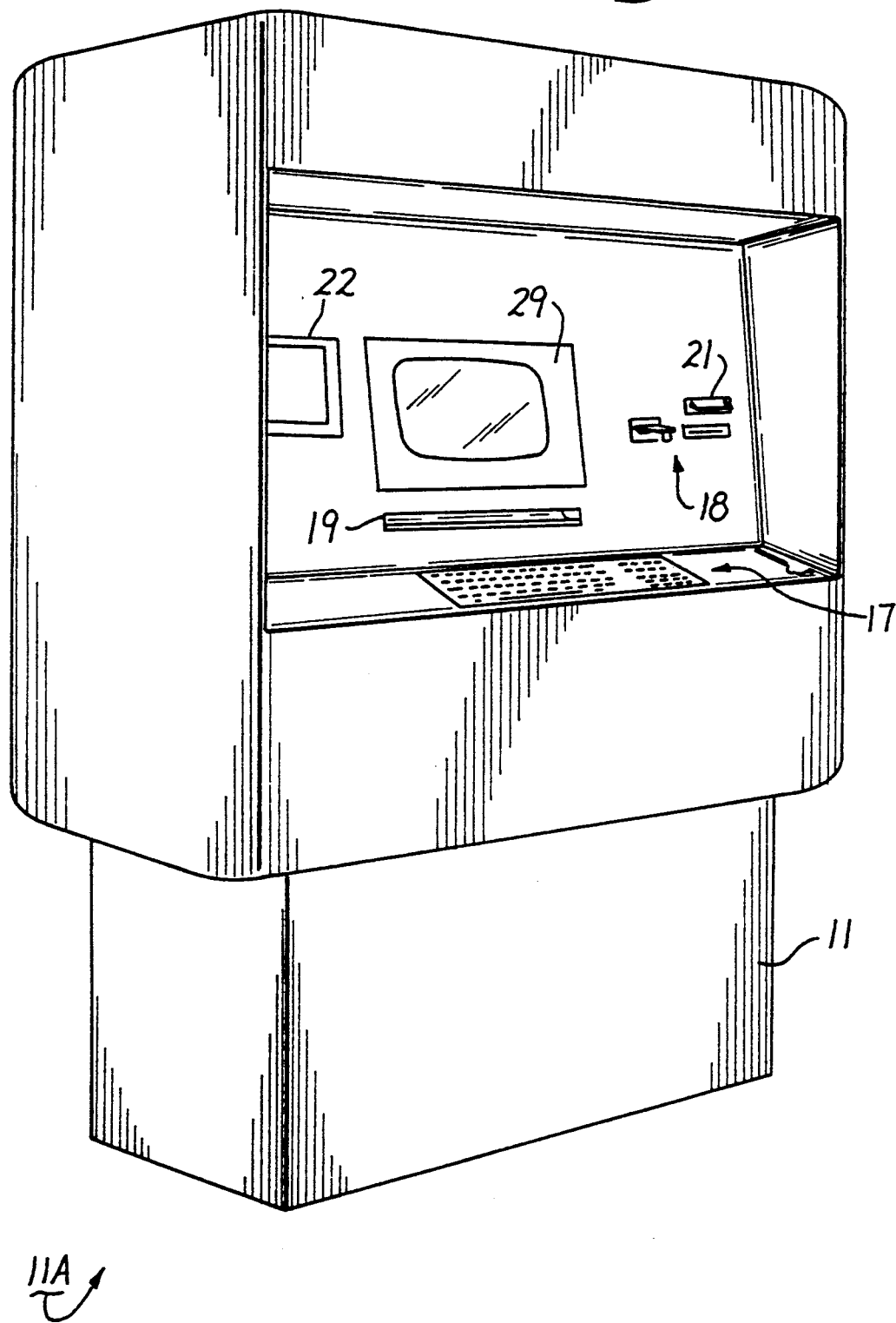
FIG. 2C is a pictorial view of the change of address terminal of FIG. 1.
Figure 2D:
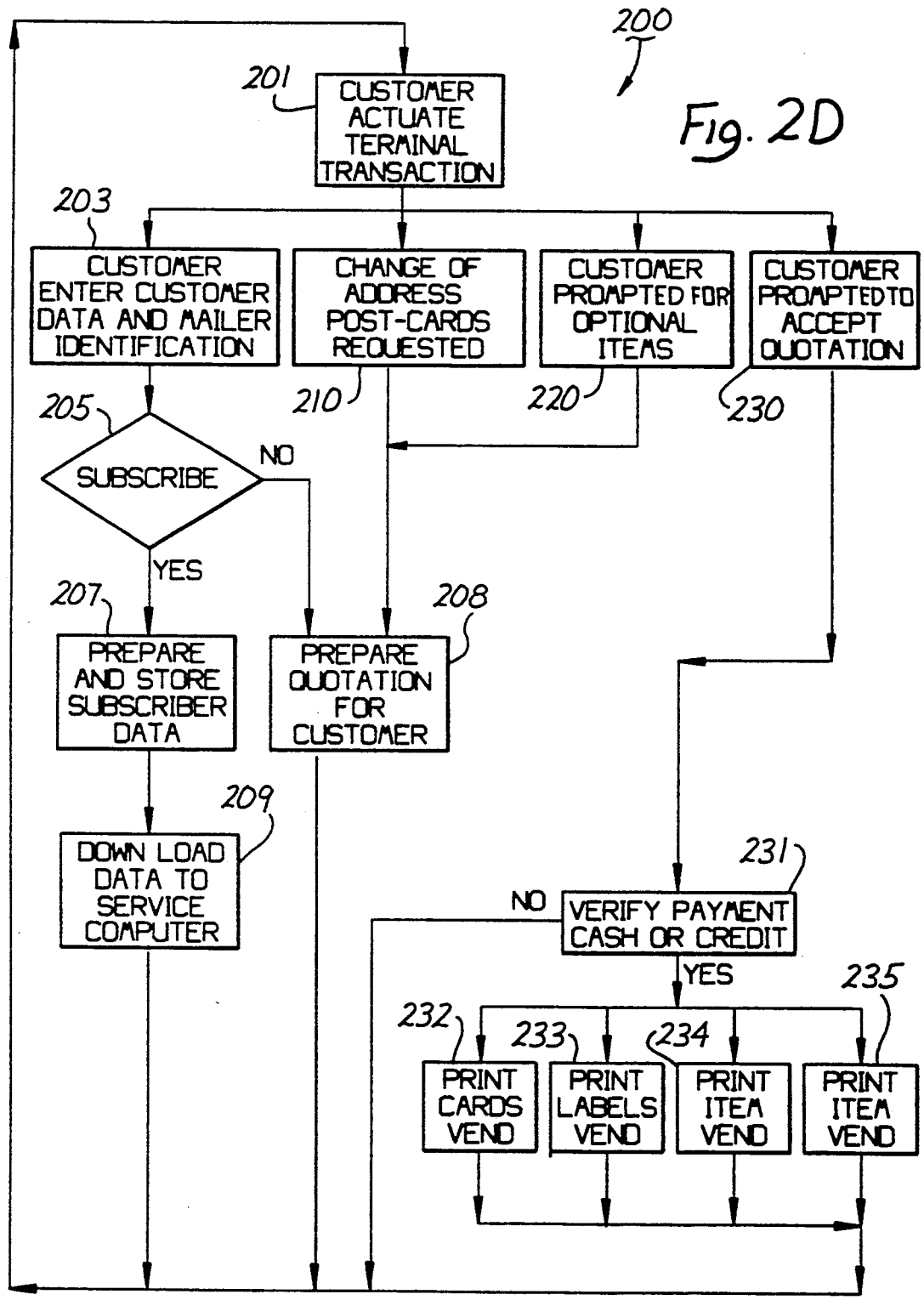
FIG. 2D is a generalized flowchart diagram of the software computer programs stored in the personal computer of FIG. 2A.

Referring to FIGS. 2D and 3-18, there is shown the computer program for the customer change of address terminal 11A as illustrated in FIG. 2C. Referring now to FIG. 2D, there is shown an overview flowchart diagram of the steps executed by the personal computer CPU 12 for notifying selected mail distributor of an individual address change and for producing customized change of address postcards and mailing labels.

Considering now the generalized flowchart shown in FIG. 2D as illustrated the operation starts at box 201 where the change of address terminal 11A remains in its READY state waiting to be actuated by a customer actuating switch 20. When switch 20 is actuated the terminal advances to box 203 where the terminal 11A begins an interactive mode of operation with the customer gather basic customer information via the keyboard entries made by the customer. Such information includes the name and new mailing address of the customer, the old mailing address of the customer, the names of subscribing distributors of mail who need to be notified of the address change for the customer, and the name and address for all non-subscribing mail distributors who need to be notified of the customer's address change.

After gathering the basic customer information the program advances to decision box 205 to determine if the customer has identified subscriber mail distributor. If subscriber mail distributors were identified the program advances to box 207 and prepares and stores the customer information in a summary report format for downloading to the master service computer 9 and for printout out a customer receipt sheet such as shown in FIG. 2F. The program then advances to box 209 and downloads the gathered customer information to the master service computer 9. The actual downloading of data occurs on a periodic basis as will be described hereinafter in greater detail. After downloading the gathered data the program returns to box 201 which now enables the program to proceed to box 210 as will be described hereinafter in greater detail.

Considering again decision box 205, if the customer indicated non-subscribing mail distributors the program also advances to box 208 and prepares a quotation for the consideration of the customer if he or she desires to notify non-subscribing distributors of mail. After preparing the quotation for the consideration of the customer the program advances to box 210 through instruction 201.

As indicated at box 210 the customer is prompted to indicate whether change of address postcards are required by the customer If the customer desires change of address postcards the program will advance to instruction 208 to prepare an additional quotation for the customer's consideration. If the customer does not require postcards the program will still advance to box 208 but no additional amounts will be calculated.

After preparing the additional quotation, if any, the program returns to box 201 and then advances to box 220. At box 220 the customer is prompted to indicate whether any other customized documents are to be prepared, such as mailing labels, business cards, and the like. The program then advances to box 208 again to prepare the additional quotation(s), if any, for the customer's consideration. The program then returns to box 201. At box 201 the program now proceeds to box 230 and prompts the customer for the acceptance of the prepared quotation. The program then proceeds to box 231 where the payment, if any, of the customer is verified. If the payment is verified the program proceeds to boxes 232–235 and prints and vends the items ordered by the customer This may include customized documents such as shown in FIG. 2E–2H. After the documents have been vended the program returns to box 201 to wait for a new customer to initiate another transaction. If the customer did not accept the prepared quotation, the program advances from box 231 to box 201 without vending the customized documents.

Considering now FIGS. 3 to 18 in greater detail, FIGS. 3 to 18 are a series of flowcharts illustrating in more detail than FIG. 2D, the steps executed by the personal computer CPU 12 of FIG. 2A. Included in FIGS. 3 to 18 are separate subroutines which may be called at various times during the operative stress of the personal computer CPU 12. A list of the various subroutines and their functions are shown in Table I.

TABLE I

| | |
|---|---|
| READY | Maintains terminal in standby state waiting for customer, and downloads customer data to master computer on daily basis. |
| PROCESS | Actuated whenever customer enters terminal, calls various subroutines based on customer response to terminal questions. |
| SELECT | Determines which product customer has selected and call subroutine to notify mail distributors of address changes. |
| QUERY | Controls the sequencing of questions to be presented to customer. |
| QUANTITY | Determines whether the terminal inventory quantitites for various customized documents are sufficient to complete customer order. |
| STYLE | Determine any special type styles customer may desire for customized documents. |
| CALCULATE | Determines charges for the products and service requested by customer. |
| VERIFY | Verifies that customer has inserted the correct amount of remittance for product/service ordered. |
| MAIN | Determines the type of mail distributors to be notified of the change of address for a given customer. |
| CATEGORY SELECTION | Determines the names of the mail distributors to be notified and stores information. Call subroutines for type of mailer selected by customer. |
| SUBSCRIBER | Determines manner in which customer desires subscriber mail distributor to be notified of mail address change |
| NON-SUBSCRIBER | Determines if non-subscriber mail distributors are to be notified of the customer's address change. |
| VERIFY ADDRESS | Verifies customer's address has been appended with correct ZIP code information. |
| RECEIPT | Activates card dispenser to print customer receipt and customized change of address post cards for customer use. |
| CREDIT CARD | Determines whether customer has an acceptable credit card for charging product/services ordered. |

Considering now the subroutine READY 300 in greater detail with reference to FIG. 3, the subroutine READY is entered at instruction 301 from any one of the following subroutines: PROCESS, SELECT, QUANTITY, VERIFY, CATEGORY SELECTION, MAILER SELECTION, SUBSCRIBER, NON-SUBSCRIBER, VERIFY ADDRESS, and CREDIT CARD.

From instruction 301, the program advances to decision instruction 303 to determine whether the master timer has elapsed. If the master timer has not elapsed, the program advances to decision box 305 to determine whether the actuation switch 20 is actuated indicating the presence of a customer. If the switch 20 has not been actuated, the program returns to decision instruction 303 to determine whether the master timer has elapsed. The program continues in this loop, until either a customer actuates the switch 20 or the master timer elapses. In this regard, it should be noted the master timer is an internally generated signal produced by the personal computer CPU 12 for its own use in downloading the stored customer data to the master service computer 9

Whenever a customer actuates switch 20, the program advances from decision box 305 to instruction 307 which calls the subroutine PROCESS which will be described herein in greater detail. After the subroutine PROCESS has been executed the program returns to instruction 303 to repeat the above described sequence of steps.

Whenever the master timer has elapsed the program will advance from decision instruction 303 to instruction 308. At instruction 308, the terminal, such as terminal 11A, downloads its store customer information to the master service computer 9. In this manner, the master service computer 9 can gather and compile the customer information each of the terminals, such as terminals 11A–11N so that a compiled report such as report 299 shown in FIG. 2I can be sent to each of the subscriber computers, such as the computers 16A–16N. From instruction 308, the program proceeds to decision instruction 310 to determine whether the terminal download operation has been completed. If the download operation has not been completed, the program returns to instruction 308 and continues the above described loop unit the download operation is completed When the download is completed, the program advances from decision box 310 to instruction box 312 to reset the master timer. After the master timer has been reset, the program returns to decision box 303 to repeat the process as just described.

Considering now the subroutine PROCESS 400 in greater detail with reference to FIG. 4, the subroutine PROCESS is entered from the READY routine at instruction 400A and proceeds to instruction 401.

The program instruction 401 sets the transaction timer to five minutes The program then proceeds to instruction 402 and calls a subroutine 500 identified as SELECT which will be described hereinafter in greater detail. While in the subroutine SELECT 500, the program prompts the customer to select an item from its menu that includes notifying various mailers of a change of address on behalf of the customer. Also included in the menu are various types of customized documents and printed matter such as business cards and change of address postcards which may be prepared at the customer's request.

When the type of printed matter has been selected by the customer, if the selection is other than a change of address postcard, the program proceeds to instruction 403 and sets a query counter to one. The program then proceeds as described in the foregoing material copending application Ser. No. 07/284,065. If the customer has selected a change of address postcard, the program then proceeds to call a subroutine 1100 identified as MAIN which will be described hereinafter in greater detail.

After the subroutine MAIN 1100 has been executed, the program proceeds to instruction 403 and sets a query counter to 1. The program then proceeds to instruction 304 and calls a subroutine 600 identified as QUERY which is decribed in greater detail in the copending U.S. Pat. application Ser. No. 07/284,065.

While in the subroutine QUERY 600, a series of pertinent questions appear on the monitor 29 for the particular type of special materials selected by the customer. The program prompts the customer to respond to each question. The customer enters responses from the keyboard, and the responses are shown on the video monitor 29.

Once all the pertinent information is entered, the program proceeds to instruction 405 to reformat the customer's input and to display the entered information for customer verification so the customer may make any necessary changes to the information previously entered into the system. The program proceeds to instruction 406 to determine if the customer has completed editing. If an editing completed signal has not been received, the program proceeds to instruction 407 to determine whether the transaction time has elapsed. If no answer is received from the customer within the predetermined transaction time limit, the program assumes the customer has left the terminal and proceeds to instruction 408 to return the system to the ready state to wait for the next customer.

If the timer has not elapsed, the program loops back to instruction 406 so the customer may continue the editing process. Once the information has been edited, the program then proceeds to instruction 409 which calls a subroutine 1600 identified as VERIFY ADDRESS which will be described hereinafter in greater detail.

After the subroutine VERIFY ADDRESS 1600 has been executed, the program returns to the subroutine PROCESS 400 at instruction 410 and increments the QUERY counter. The program then proceeds to instruction 411 which calls a subroutine 700 identified as QUANTITY which is described in copending U.S. Pat. application Ser. No. 07/284,065. While in the subroutine QUANTITY 700, the program requests the customer to enter the quantity of materials required so that a determination may be made that the system has sufficient quantity of printing material to fill the customer's order, if placed.

If the quantity required by the customer exceeds the available supply, the system displays a message on the video monitor 29 notifying the customer of the lesser quantity, which may be ordered. If the customer desires to purchase the lesser quantity indicated on the monitor, the program proceeds to instruction 412. If no response is received, the system returns to the ready state.

Once the available and ordered quantity has been determined, the program proceeds to instruction 412 and calls a subroutine 800 identified as STYLE to determine if any special options are required by the customer such as type style, formats, etc. The subroutine STYLE 800 is described in greater detail in the copending U.S. Pat. application Ser. No. 07/284,065.

Once all the necessary information has been gathered at the change of address terminal 11A,,such information including type style, data, and quantity, the program proceeds to instruction 413 so that the, interface unit 13 can transmit the gathered information to the data processing personal computer 12 via the interface 13. The instruction 413 calls a subroutine 900 identified as CALCULATE, which is described in greater detail in the copending U.S. Pat. application Ser. No. 07/284,065. The personal computer 12 performs the desired quote calculation, and sends the quotation information back to the terminal for display on the video monitor 29. This information is also transmitted to the coin and bill acceptor 18, as well as the credit card acceptor 21.

On receipt of the quotation, the program proceeds to instruction 414 and calls a subroutine 1000 identified as VERIFY, which is described in greater detail in copending U.S. Pat. application Ser. No. 07/284,065. While in the subroutine VERIFY 1000, the user is asked if he or she desires to purchase the requested labels, postcards, or other special materials based on the quotation. If the answer is no, the customer is thanked and the terminal returns to the ready state to wait for the next customer.

If the answer is yes, the program prompts the customer to insert the appropriate amount of payment either in cash or by credit card for the requested materials, and the payment verification process is completed by the subroutine VERIFY 1000. If the customer fails to insert the proper amount of money or an acceptable credit card within the predetermined transaction time, the program returns to the ready state to wait for the next customer, If the customer inserts money into the coin and bill acceptor 18, the bill and coin acceptor 18 transmits the information regarding the amount of money that has been received from the customer to the data processing personal computer 12 for verification of the proper sum.

If the data processing personal computer 12 determines that the customer has inserted a bill that is too large to remit change, the computer 12 instructs the bill and coin acceptor to return the inserted money to the customer. If the bill is too large, a message is displayed notifying the customer and requesting a smaller bill be inserted. If the requested amount is not inserted into the coin bill acceptor 18, the program returns to the ready state. This procedure results in either rejection or acceptance of payment, and corresponding data is transmitted from the data processing personal computer 12 to the interface unit 13 so the appropriate response may be displayed on the video terminal 29.

If payment is accepted, the bill and coin acceptor 18 sends an accepted signal and the program displays the total amount paid and then proceeds to decision instruction 414A where the program determines whether small document cards such as document cards 260, 270, 280 and 290 are to be printed. If small documents cards are to be printed, the program proceeds to instruction 414B and calls a subroutine 1700, identified as RECEIPT which will be described hereinafter in greater detail.

If small document cards are not to be printed, the program advances to instruction 415. After the subroutine RECEIPT 1700 is executed, the program advances to instruction 415. At instruction 415, the document information previously collected for special printing tasks is transmitted to the interface unit 13 and a document print sequence is initiated. The document information sent by the data processing personal computer 12 to the document printer 19 causes the documents, such as resumes and labels, to be printed and dispensed to the customer.

The program then proceeds to instruction 416 and calls a subroutine 600 identified as QUERY. While in the subroutine QUERY 600, the customer is again asked to respond to a series of demographic questions. The program returns to the ready state if the customer does not respond. After the customer answers the questions, the answers are stored and the program returns to the ready state.

The sequence of operations carried out by the data processing personal computer 12 in performing quotation calculations, carrying out payment verification, and issuing print commands, will now be described with reference to the flowchart diagrams shown in FIGS. 11-18.

Figure 11:
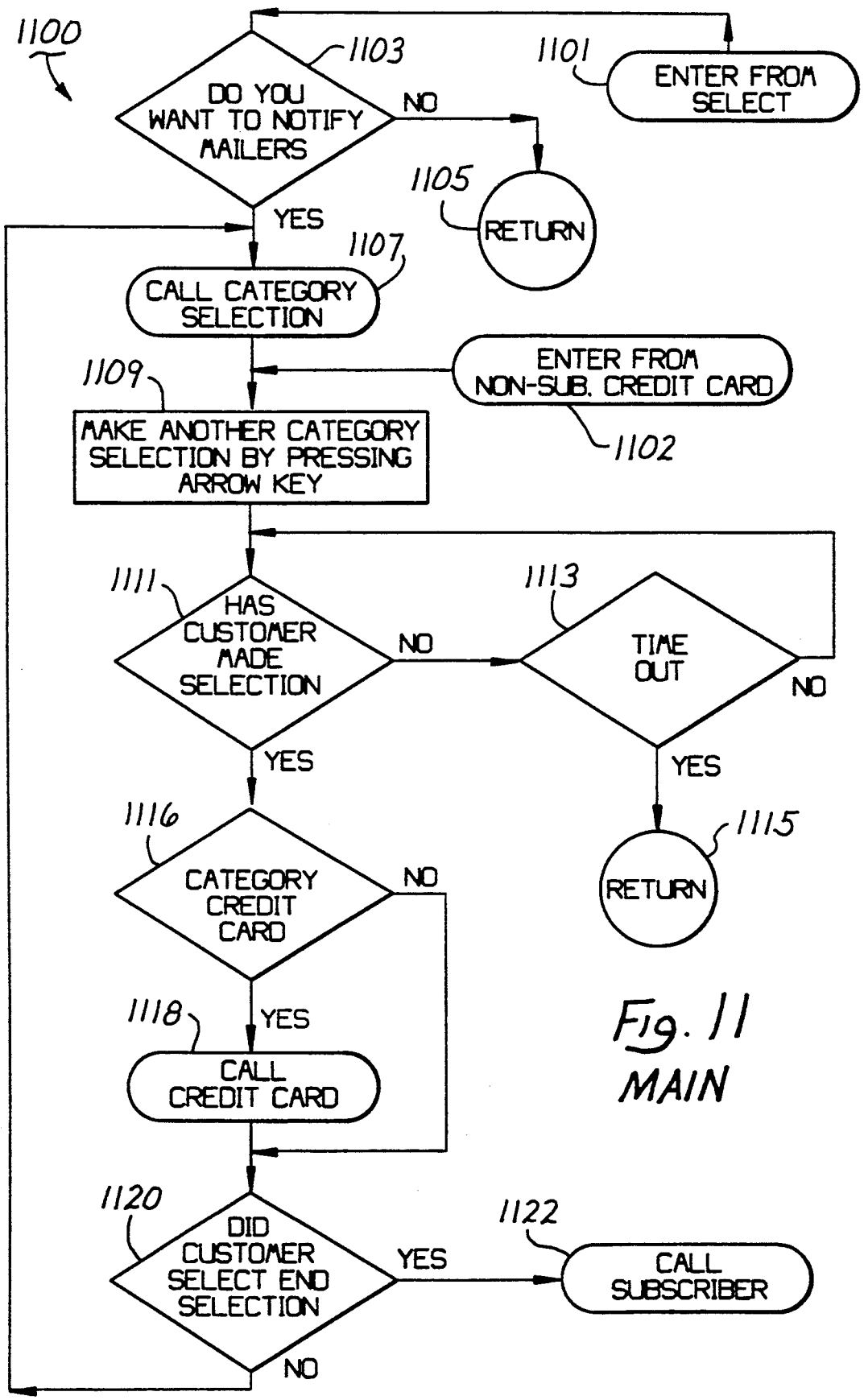

Considering now the subroutine MAIN 1100 in greater detail with reference to FIG. 11, the subroutine MAIN 1100 is entered at instruction 1101 from the SELECT subroutine 500 and proceeds to decision instruction 1103. At decision instruction 1103 the customer is prompted with a question asking whether the customer wants to notify mailers If the customer indicates that the mailers are not to be notified, the program proceeds to instruction 1105 which returns the program to the SELECT subroutine 500 at instruction 524.

If the customer indicates that the mailers are to be notified, the program proceeds to instruction 1107 which calls a subroutine 1200 identified as CATEGORY SELECTION, which will be described hereinafter in greater detail. After the program returns from the CATEGORY SELECTION subroutine 1200, the program proceeds to instruction 1109 which prompts the customer to make another category selection by pressing the arrow key on the keyboard 17.

The program then proceeds to decision instruction 1111 to make a determination as to whether the customer has made another category selection. If the customer has not made another category selection, the program proceeds to decision instruction 1113 to determine whether the transaction timer has timed out. If the instruction timer has not timed out, the program loops back to decision instruction 1111 to determine whether the customer has made another category selection. This looping process continues until either the customer has made another category selection, or the transaction timer has timed out.

Should the transaction timer times out, the program proceeds to instruction 1115 which returns the program to the SELECT subroutine 500 at instruction 524. If the customer has made another category selection, the program proceeds to decision instruction 1116 to determine whether the category selected was the credit card category. If the category selection was the credit card selection the program proceeds to instruction 1118 which calls a subroutine 1800 identified as CREDIT CARD, as hereinafter described in greater detail.

When the program returns from the CREDIT CARD subroutine 1800, it proceeds to decision instruction 1120 to determine whether the category selected by the customer was the END selection. At decision instruction 1116, if the customer had not selected the CREDIT CARD category, the program proceeds directly to instruction 1120 to determine whether the customer made the END selection. At decision instruction 1120, if the customer made the END selection the program branches to instruction 1122 which calls a subroutine 1400 identified as SUBSCRIBER which will be described hereinafter. If the customer did not make the END selection, the program loops back to instruction 1107 which calls the subroutine CATEGORY SELECTION 1200 as previously described.

Figure 12A:
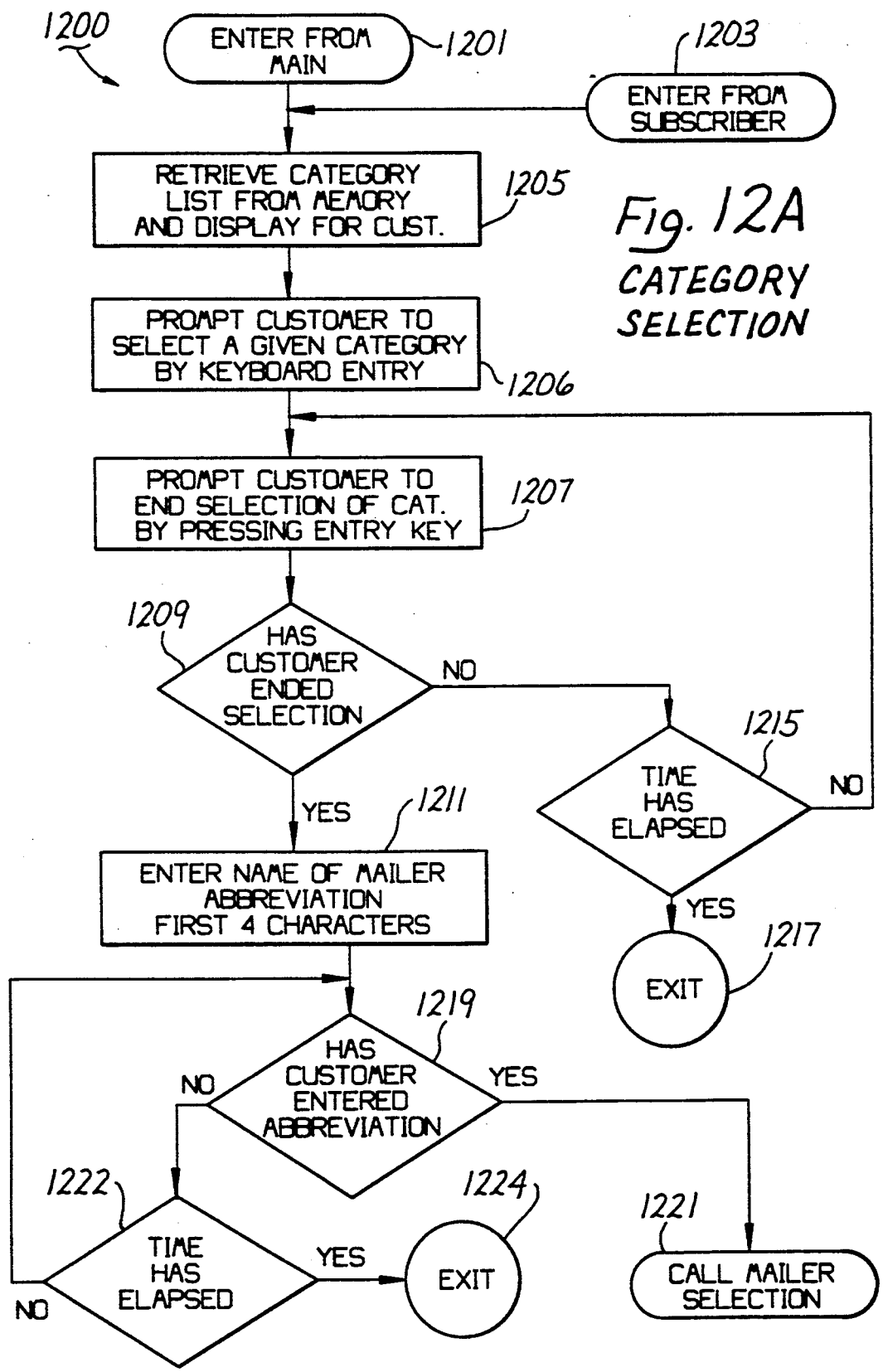
Figure 12B:
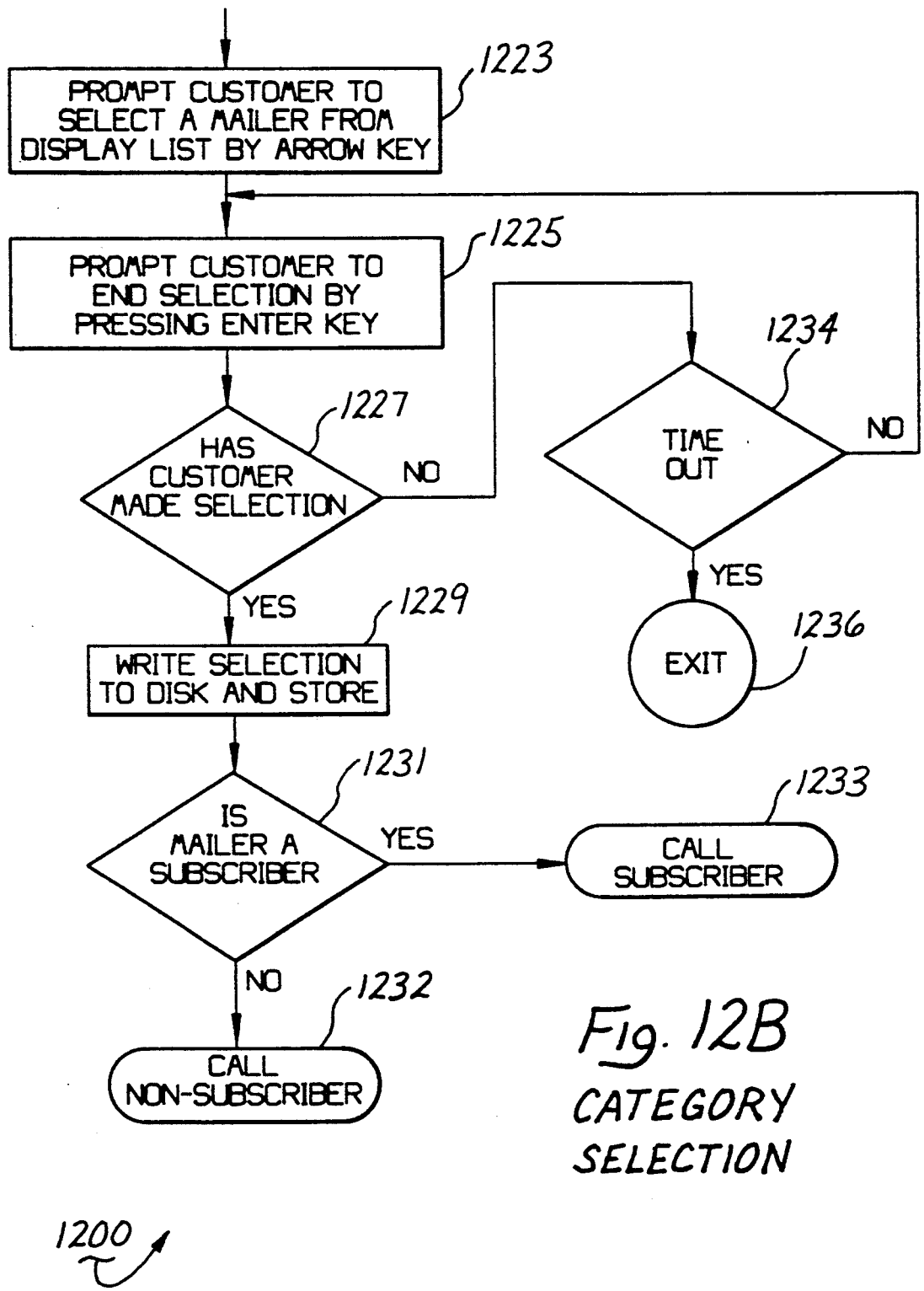

Considering now the subroutine CATEGORY SELECTION 1200 in greater detail with reference to FIG. 12A, the subroutine CATEGORY SELECTION 1200 is entered from the subroutine MAIN 1100 at instruction 1201. Upon entering the CATEGORY SELECTION subroutine at instruction 1201, the program proceeds to instruction 1205 where the terminal prompts the personal computer 12 to retrieve from its memory, the category list so that it may be displayed on the video monitor 29.

After the category list has been retrieved and is displayed on the video monitor 29, the program proceeds to instruction 1206 to prompt the customer to select a given category by making a keyboard entry via the keyboard 17. Thus, the customer using the arrow key on keyboard 17 moves the cursor displayed on the video monitor 29 to highlight a given category. After the customer is prompted to select a given category, a message is displayed at instruction 1207 to prompt the customer to end the selection of a category by pressing the enter key on keyboard 17. The program then proceeds to decision instruction 1209 to determine whether the customer has ended the selection process.

If the customer has not ended the selection process, the program branches to decision instruction 1215 to determine whether the transaction timer has elapsed. If the transaction timer has elapsed, the program goes to instruction 1217 which returns the terminal to the READY state. If the transaction timer has not elapsed, the program returns to instruction 1207 and again prompts the customer to end the selection of a category by pressing the ENTER key.

The above described loop is repeated, until either the transaction timer has elapsed, or the customer has ended the selection by pressing the ENTER key. If the customer ends the selection of category by pressing the ENTER key, the program proceeds to instruction 1211, where the customer is prompted to enter the name of a mailer by entering an abbreviation for the name of mailer which consists of the first four letter characters of the mailer's name. After the customer has been prompted to enter the first four characters of the mailer's name, the program proceeds to decision instruction 1219 to determine whether the customer has entered the abbreviation and depressed the ENTER key.

If the customer has not entered the four characters and depressed the ENTER key, the program branches to decision instruction 1222 to determine whether the transaction timer has elapsed. If the transaction timer has elapsed, the program proceeds to instruction 1224 which returns the program to the READY state. If the transaction timer has not elapsed, the program loops back to decision instruction 1219 to determine whether the customer has entered the abbreviations and depressed the ENTER key. This loop is repeated as described until either the customer enters the four characters and depresses the ENTER key, or the transaction timer has elapsed. If the customer has entered the four character abbreviations and depressed the ENTER key, the program goes to instruction 1221 which calls a subroutine 1300 identified as MAILER SELECTION, which will be described hereinafter in greater detail.

After the subroutine MAILER SELECTION 1300 has been executed, the program proceeds to instruction 1223 as indicated in FIG. 2B. At instruction 1223, the customer is prompted to select the mailer from the displayed list by again depressing the arrow key, until a selected mailer has been highlighted. The program then proceeds to instruction 1225 which prompts the customer to end the selection by pressing the ENTER key on the keyboard. After the customer has been prompted to end the selection by pressing the ENTER key, the program proceeds to decision instruction 1227 to determine whether the customer has made the selection by pressing the ENTER key.

If the customer has not depressed the ENTER key, the program proceeds to decision instruction 1234 to determine whether the transaction timer has timed out. If the transaction timer has timed out, the program proceeds to instruction 1236 which returns the terminal to the READY state. If the transaction has not timed out, the program loops back to instruction 1225 where the customer is prompted to end the selection by pressing the ENTER key.

This loop is repeated until either the customer ends the selection process by pressing the enter key, or the transaction timer times out. If the customer ends the selection by pressing the ENTER key, the program proceeds from decision instruction 1227 to instruction 1229 where the selection made by the customer is transferred via the interface unit 13 to the storage media 23 for storage.

After the selection has been stored on the storage media, the program proceeds to decision instruction 1231 to determine whether the selection made by the customer is a subscriber mailer. If the selection made by the customer is a subscriber mailer, the program proceeds to instruction 1233 and calls a subroutine 1400 identified as SUBSCRIBER which will be described hereinafter in greater detail.

If the selection made by the customer is a non-subscriber, the program proceeds to instruction 1232 which calls a subroutine 1500 identified as NON-SUBSCRIBER, as hereinafter described in greater detail. After the program executes the subroutine SUBSCRIBER 1400, the program returns to instruction 1203 to repeat the category SELECTION subroutine as previously described herein.

Considering now the subroutine MAILER SELECTION 1300 in greater detail with reference to FIG. 13, the subroutine MAILER SELECTION 1300 is entered from the subroutine CATEGORY SELECTION at instruction 1301. The program proceeds from instruction 1301 to instruction 1303 which searches the files in storage media 23 for mailers with the given abbreviation letters as entered by the customer. The program then advances to instruction 1305. At instruction 1305, as each mailer with the given abbreviation letters as entered by the customer are retrieved, they are displayed on the video monitor 29 in alphabetical listing for the customer's selection.

The program then advances to decision box 1307. At 1307 if the retrieved list of mailers does not exceed a predetermined number of entries, the program advances to instruction 1309 which returns the program to the subroutine CATEGORY SELECTION 1200 at instruction 1223 as previously described. If the category list exceeds X entries, the program goes to instruction 1311 and prompts the customer to select the next word of the mailer's name by entering the first letter of the mailer's second name.

After prompting the customer to enter the additional information, the program proceeds to decision instruction 1313 to determine whether the customer has made the selection entry. If the customer has not made the selection entry by entering the letter and pressing the ENTER key, the program proceeds to decision instruction 1319 to determine whether the transaction timer has timed out. If the transaction timer has timed out, the program proceeds to instruction 1321 which returns the terminal to the ready state. If the transaction timer has not timed out, the program loops back to decision instruction 1313 to determine whether the customer has made the additional selection.

This loop is repeated until the customer either enters the additional selection information or the transaction timer times out. If the customer makes the additional entry selection, the program proceeds to instruction 1315 and displays the list of mailers beginning at the first mailer in the list. The program then advances to instruction 1317 which returns the program to the subroutine CATEGORY SELECTION 1200 at instruction 1223 as previously described.

Considering now the subroutine SUBSCRIBER 1400 with reference to FIG. 14 in greater detail, the subroutine SUBSCRIBER 1400 is entered at instruction 1401 from the subroutine CATEGORY SELECTION 1200 and proceeds to instruction 1403. At instruction 1403, the user is prompted to select another category.

After the user is prompted to select another category, the program advances to decision instruction 1405 to determine whether another category has been selected by the customer. If the customer has not made another category selection, the program advances to decision instruction 1406 and prompts a customer as to whether he or she wants to have change of address postcards prepared. If the customer does not so indicate, the program advances to decision instruction 1405 to determine whether the customer has made another category selection.

If the customer has not made another category selection, the program proceeds to instruction 1406 where the customer is prompted as to whether the or she desires to have change of address postcards prepared. If the customer has not indicated that postcards are to be prepared, the program goes to decision instruction 1415 to verify whether or not the customer has entered the information.

If from decision instruction 1415, the program proceeds to decision instruction 1417, if the customer has not made another category selection, or indicated whether or not he or she wants change of address postcards prepared. At decision instruction 1417 the transaction timer is examined to determine whether it has timed out. If the transaction timer has not timed out, the program advances to instruction 1418 which returns the terminal to its ready state. If the transaction timer has not timed out, the program loops back to decision instruction 1406 to again prompt the customer as to whether or not postcards are to be prepared.

This loop is repeated until the customer either makes an indication that he or she desires postcard's, or the transaction timer has timed out. If the transaction timer has not timed out, the program loops back to decision instruction 1405 to determine whether the customer has made another category selection. This process is repeated until either the transaction timer times out, or the customer makes another category selection, or makes a determination that he or she does not want to have change of address postcards prepared. If the customer indicates that postcards are not to be prepared, the program advances to instruction 1419 which branches the program to the vending subroutine as will be described hereinafter in greater detail.

Figure 15:
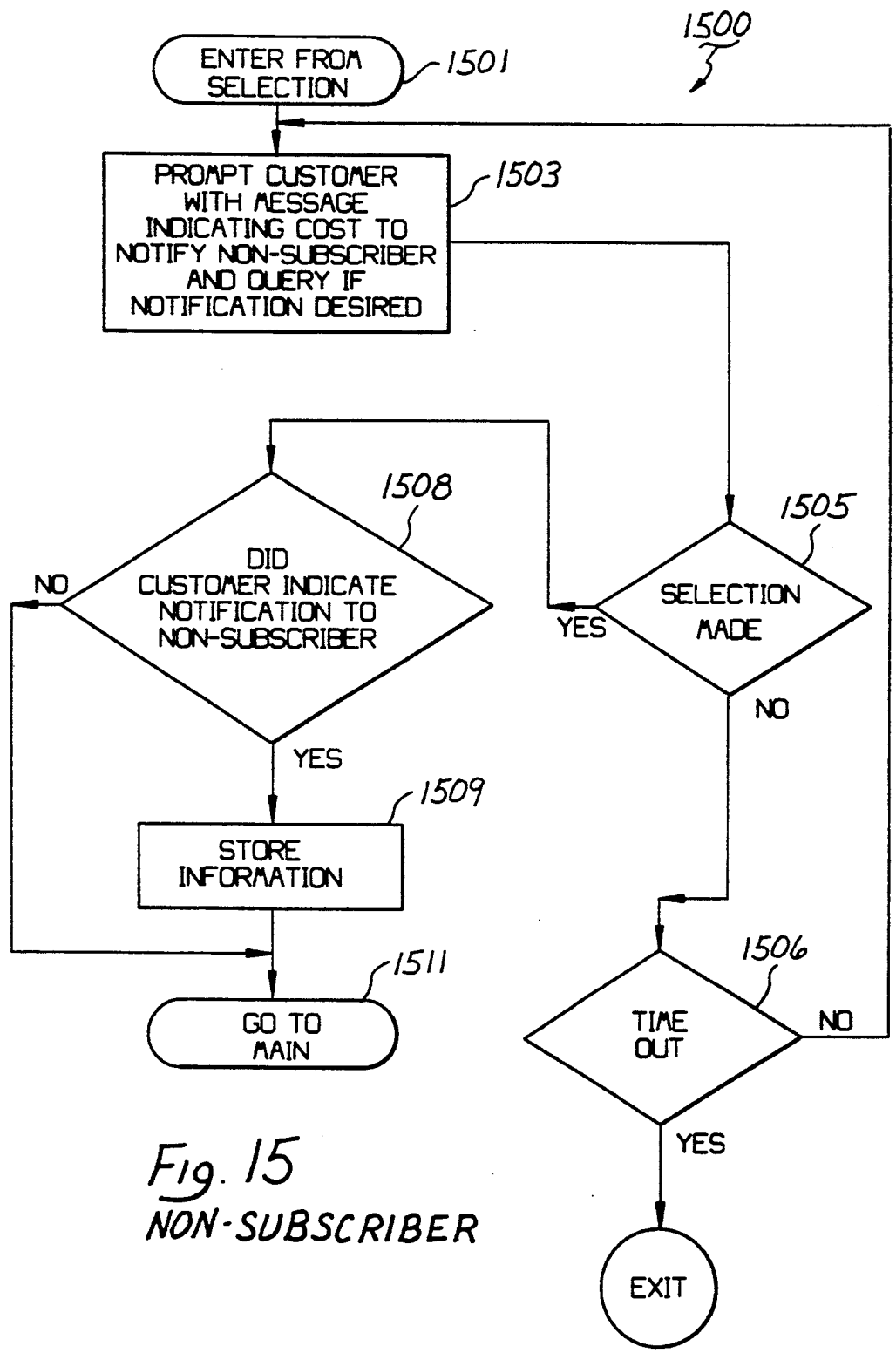

Considering now the subroutine NON-SUBSCRIBER in greater detail with reference to FIG. 15, the subroutine NON-SUBSCRIBER is entered at instruction 1501 from the subroutine SELECTION. From instruction 1501, the program proceeds to instruction 1503 where the customer is prompted with a message indicating the cost to notify non-subscribers and is queried to enter a decision as to whether a notification of the non-subscriber is desired by the customer.

Considering now the subroutine NON-SUBSCRIBER in greater detail with reference to FIG. 15, the subroutine NON-SUBSCRIBER is entered at instruction 1501. From instruction 1501, the program proceeds to instruction 1503 where the customer is prompted with a message indicating the cost to notify non-subscribers and asked to make an indication of whether or not he or she desires to notify the non-subscribing mailers. After the customer has been prompted with this message, the program advances to decision instruction 1505 to determine whether or not the customer has made a yes or no selection.

Considering now the subroutine NON-SUBSCRIBER in greater detail with reference to FIG. 15, the subroutine NON-SUBSCRIBER is entered at instruction 1501. From instruction 1501, the program proceeds to instruction 1503 where the customer is prompted with a message to indicate the cost of notifying non-subscriber mailers and a query is made as to whether the customer desired to have notification sent to the non-subscriber mailers.

From instruction 1503, after the customer has been prompted, the program proceeds to decision instruction 1505 where a determination is made, as to whether or not a selection has been made by the customer. If the customer has not made a selection, the program advances to decision instruction 1506 to determine whether the transaction timer has timed out. If the transaction timer has timed out at instruction 1506, the program advances to instruction 1507 which causes the program to exit and return the terminal to the ready state.

If the transaction timer has not timed out, the program loops back to instruction 1503, where again the customer is prompted with a message indicating the cost of notifying non-subscribers and queried if notification is desired. If a selection is made by the customer at decision box 1505, the program branches to decision instruction 1508, where the type of indication made by the customer is determined.

If the customer indicated that he or she did not wish to notify the non-subscriber mailers, the program advances to instruction 1511 which takes the two instruction 1102 in the subroutine MAIN. If the customer indicated that non-subscribers were to be notified of the change of address, the program advances to 1509 to store the information entered by the customer. After the information has been stored, the program advances to instruction 1511 which again returns the program to the subroutine MAIN as previously described.

Figure 16:
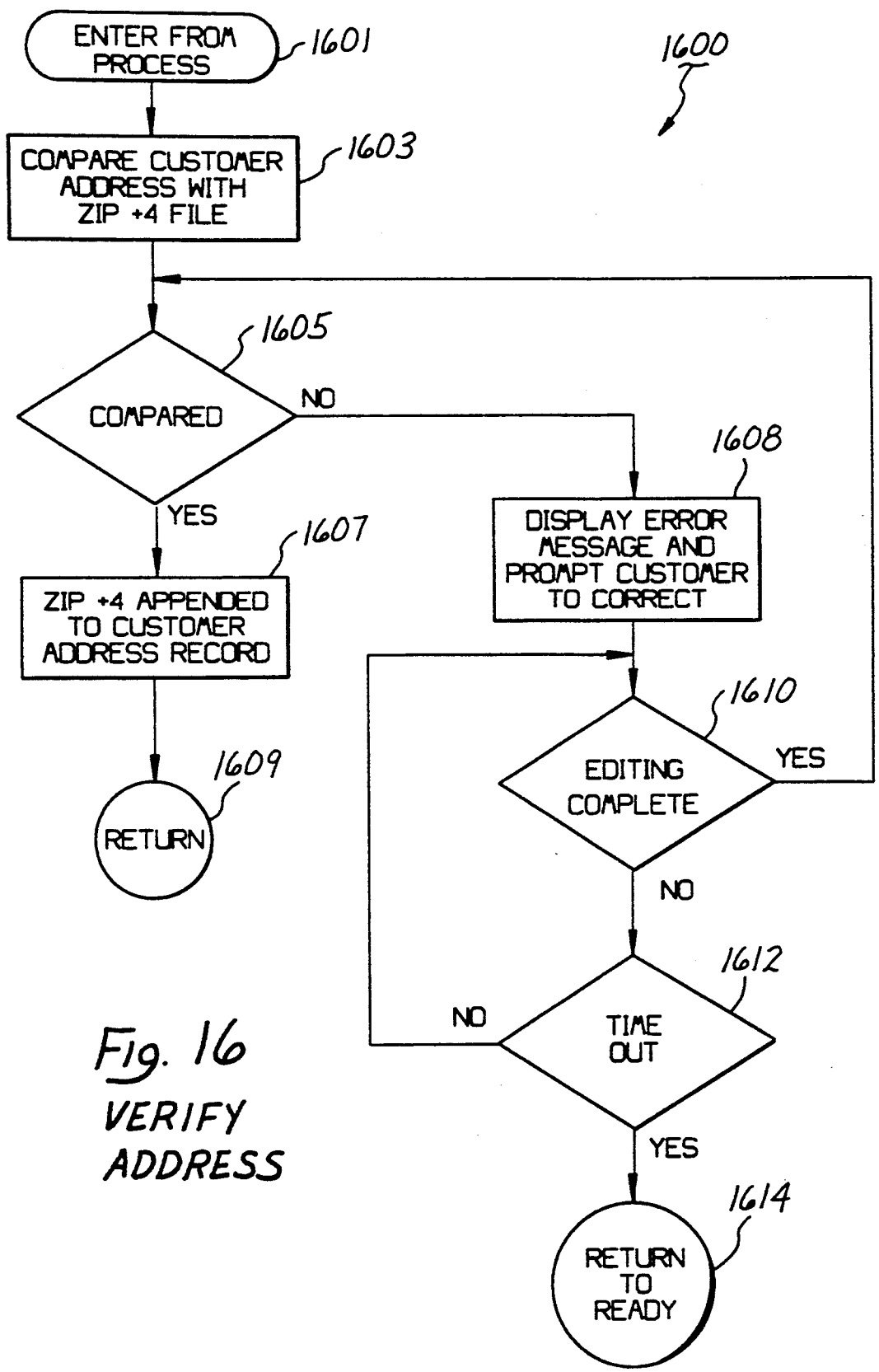

Considering now the subroutine VERIFY address in greater detail with reference to FIG. 16, the subroutine VERIFY address is entered at instruction 1601. From instruction 1601, the program proceeds to instruction 1603 where the customer's address as entered by the customer, is compared with the ZIP+4 file. From instruction 1603, the program advances to decision box 1605 to compare the customer address with the proper ZIP+4 file information. If there is not a proper comparison, the program advances to decision box 1608 where an error message is displayed to the customer, and the customer is again prompted to correct the error.

From instruction 1608, the program advances to decision box 1610 where it is determined whether or not the editing has been completed by the customer. If the editing has not been completed by the customer, the program advances to decision box 1612 where the transaction timer is examined. At instruction 1612, if it is determined that the transaction timer has not timed out, the program returns back to decision box 1610 to determine whether the customer has completed editing. If the time out timer has timed out, the program advances to box 1614 which returns a terminal to the READY state.

The program continues to loop between instruction 1610 and 1612, until either the transaction timer times out, or the editing has been completed by the customer. If the customer has completed editing, the program goes from instruction 1610 to instruction 1605. At instruction 1605, the ZIP code information is again compared with the ZIP+4 file to determine whether there is a proper comparison. If there is not a proper comparison, the program again branches to instruction 1608 as previously described.

If there is a proper comparison, the program proceeds from decision box 1605 to instruction 1607 where the ZIP+4 information of the customer is appended to the customer address record. From instruction 1607, the program advances to instruction 1609 which returns the program back to the subroutine PROCESS at instruction 1410.

Figure 17:
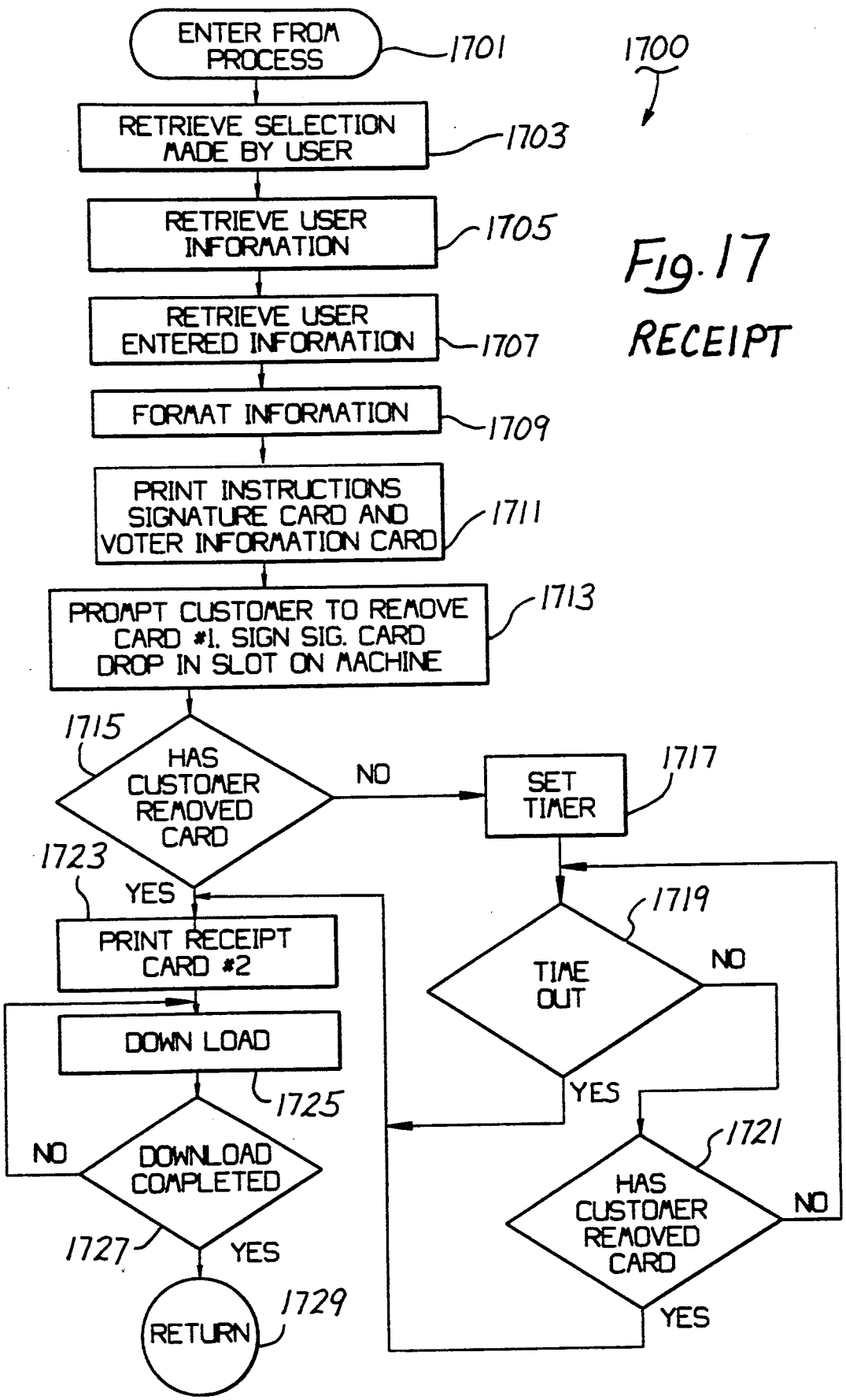

Considering now the subroutine RECEIPT with reference to FIG. 17 in greater detail, the subroutine RECEIPT is entered from instruction 1701 from the subroutine PROCESS. From instruction 1701, the program proceeds to instruction 1703 where the selection made by the user is retrieved. After the selection has been retrieved, the program advances to instruction 1705 which retrieves the user information entered by the user. From instruction 1705, the program proceeds to instruction 1707 where the user information is retrieved.

After the user information is retrieved, the program proceeds to instruction 1709 where the information is formatted in proper form. After the information has been formatted for printing purposes, the program advances to instruction 1711, which enables the printer to print instructions, a signature card, and a voter information card for the customer. After the documents have been printed, the customer is prompted to remove the first card from the printer, and to sign the card and to drop it into a slot which is provided on the terminal.

From instruction 1713, the program advances to decision box 1715 to determine whether the customer has removed the card from the printer. If the customer has not removed the card from the printer, the program advances to box 1717 which sets a timer for the customer to remove the card. The program advances from box 1717 to box 1719 to determine whether the special timer has timed out.

If the timer has not timed out, the program advances to instruction 1721 to determine whether the customer has now removed the card. If the customer has not removed the card, the program loops back to decision box 1719 to determine whether the special timer has timed out. If the customer has removed the card, the program branches to instruction 1723 where a new or receipt card is printed out.

If the customer does not remove the card before the special timer times out, the program automatically advances to instruction 1723, and causes the second card, which will be attached to the first card, to be printed by the printer.

After the second card has been printed, the program advances to instruction 1725 which downloads the information. After the information has started to be downloaded, the program advances to decision box 1727 to determine whether the downloading of information has been completed. If the downloading of information has not been completed, the program loops back to instruction 1725 and continues to loop between 1725 and 172,, until the downloading has been completed. Once the downloading has been completed, the program advances from instruction 1727 to instruction 1729, which returns the program back to the subroutine PROCESS at instruction 415.

Figure 18:
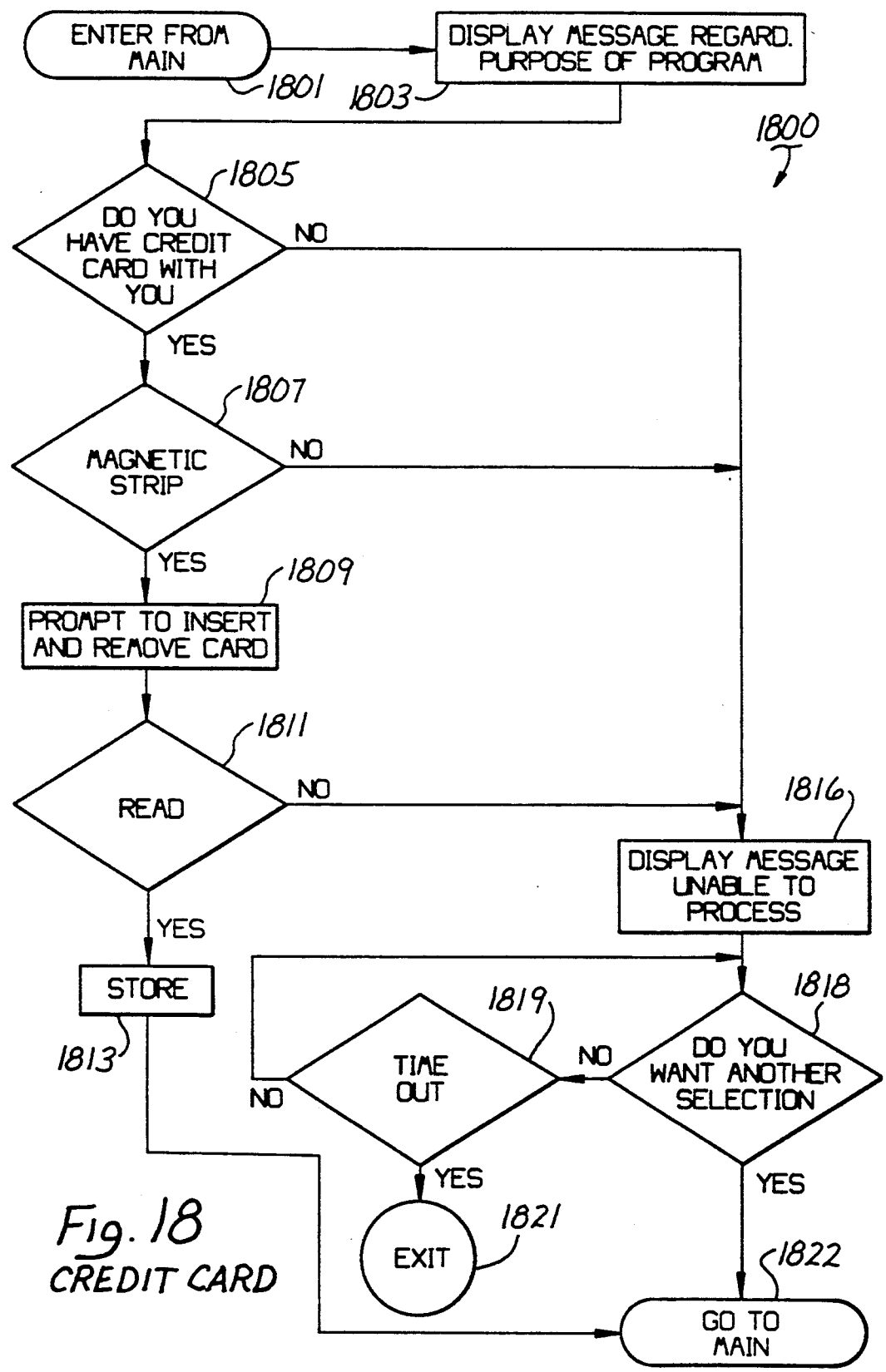

Considering now the subroutine CREDIT CARD with reference to FIG. 18, the subroutine CREDIT CARD is entered from the subroutine MAIN at instruction 1801. From instruction 1801, the program proceeds to instruction 1803 which displays a general message to the user regarding the purpose of the program. After the message has been displayed, the program advances to decision box 1805 where the customer is prompted as to whether or not he or she has a credit card with them.

If the customer indicates that they do not have a credit card with them, the program advances to instruction 1816 where a message is displayed that the terminal is unable to process the customer's request for a credit card transaction, since there is no credit card available for use by the customer.

After displaying the UNABLE TO PROCESS message, the program advances to decision box 1818, where the customer is prompted as to whether or not another selection is to be made. If the customer does not indicate a desire to make another selection, the program advances to decision box 1819, where the transaction timer is examined. If the transaction timer has timed out, the program advances to box 1821 which takes the terminal back to the READY state.

If the time out timer has not timed out, the program advances back to decision box 1818 to prompt the customer again, as to whether or not he or she desires to make another selection. This process is repeated until either the transaction timer times out, or the customer indicates that another selection is desired. If the customer indicates another selection is desired, the program advances from decision box 1818 to instruction 1822 which returns the program back to the subroutine MAIN at instruction 1120.

Returning again to decision box 1805, if the customer indicates that he or she does have a credit card, the customer is asked whether or not the credit card includes a magnetic strip. If the customer does not indicate whether the card has a magnetic strip, the program advances to instruction 1816 as previously described.

If the customer indicates that the credit card has a magnetic strip, the program advances from decision box 1807 to instruction 1809, where the customer is prompted to insert and remove his or her credit card in the credit card acceptor 21. The program, after prompting the customer to insert and remove the card, advances to decision box 1811 to determine whether or not the magnetic bars on the magnetic strip were able to be read by the credit card acceptor 21. If the credit card acceptor was unable to read the magnetic bars on the credit card, the program advances to instruction 1816 as previously described If the credit card acceptor was able to read the magnetic coding, the program advances to instruction 1813 to store the information, and then advances to instruction 1822, which returns the program back to the subroutine MAIN as previously described.

D. CUSTOMIZED DOCUMENTS

Figure 2E:
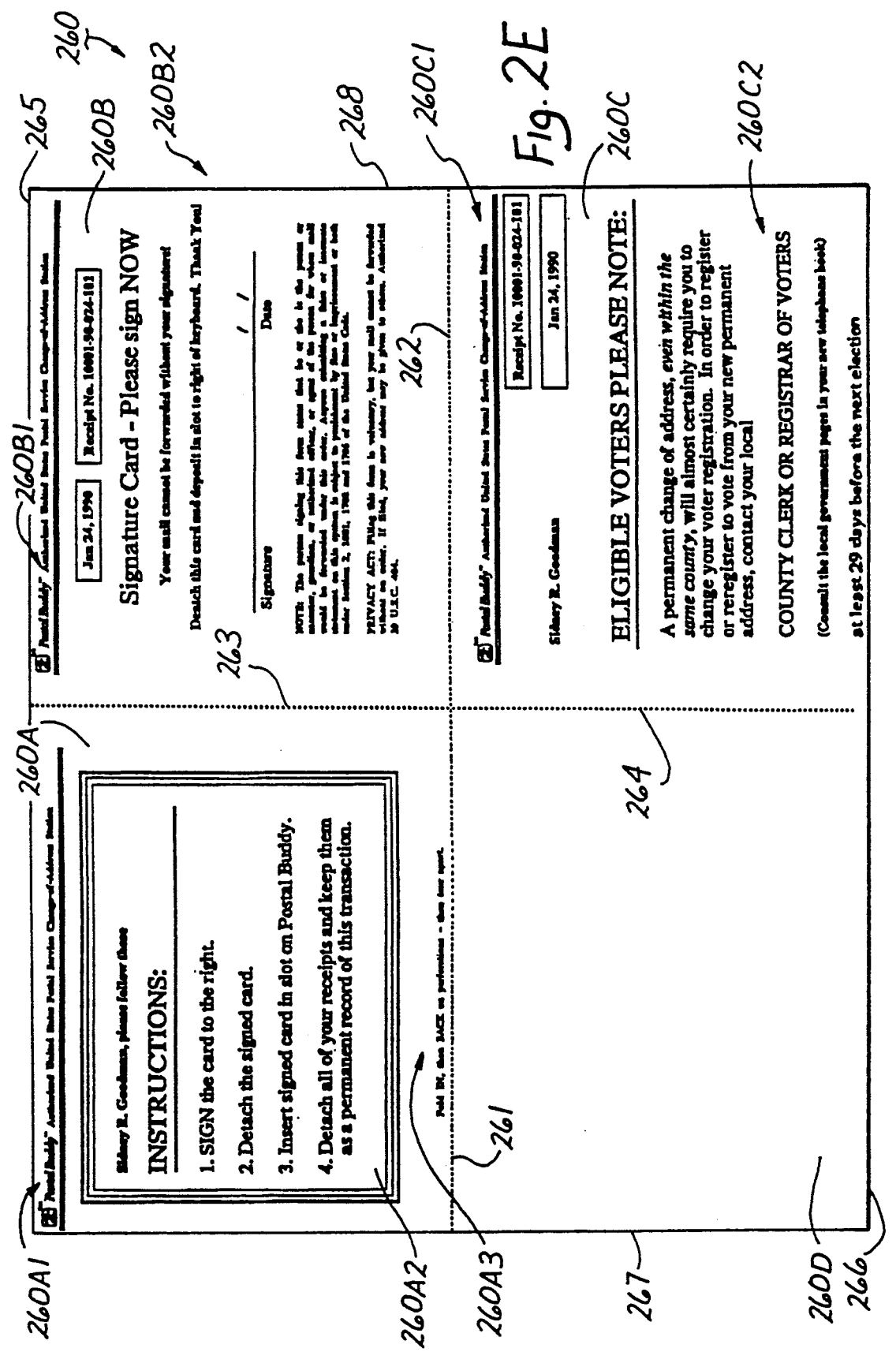

Considering now the customized documents prepared by the change of address terminal 11A in greater detail with reference to FIGS. 2E-2H and FIG. 17, at instruction 1711 the subroutine RECEIPT 1700 causes the card dispenser mechanism 22 to print and vend an instruction sheet 260 shown in FIG. 2E. In this regard, sheet 260 is the first sheet to be printed. After the customer has been given a predetermined amount of time to remove sheet 260, the dispenser mechanism 22 prints and vends a receipt sheet 270 as shown in FIG. 2F.

Figure 2G:
Figure 2H:
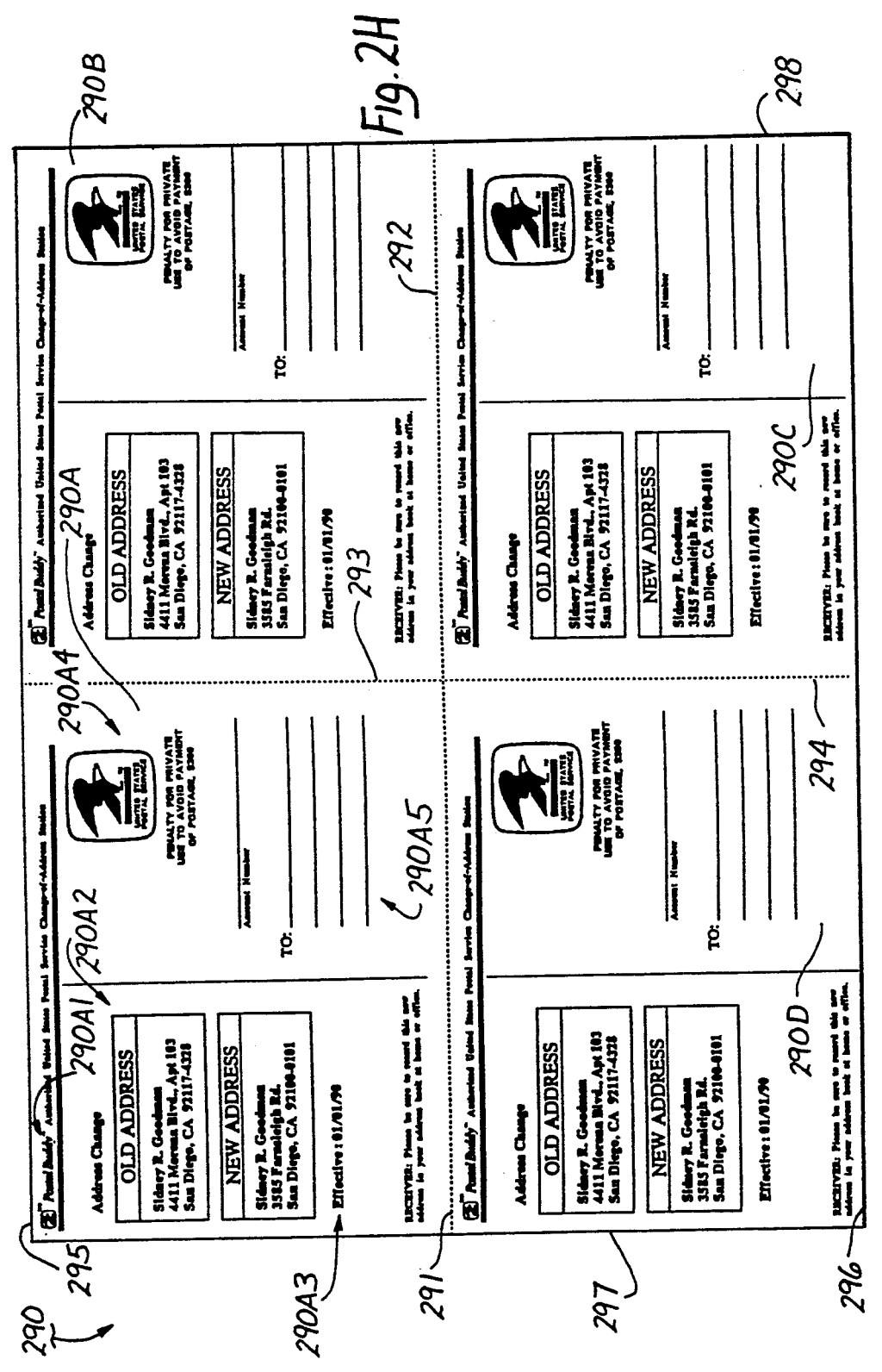
Figure 9:
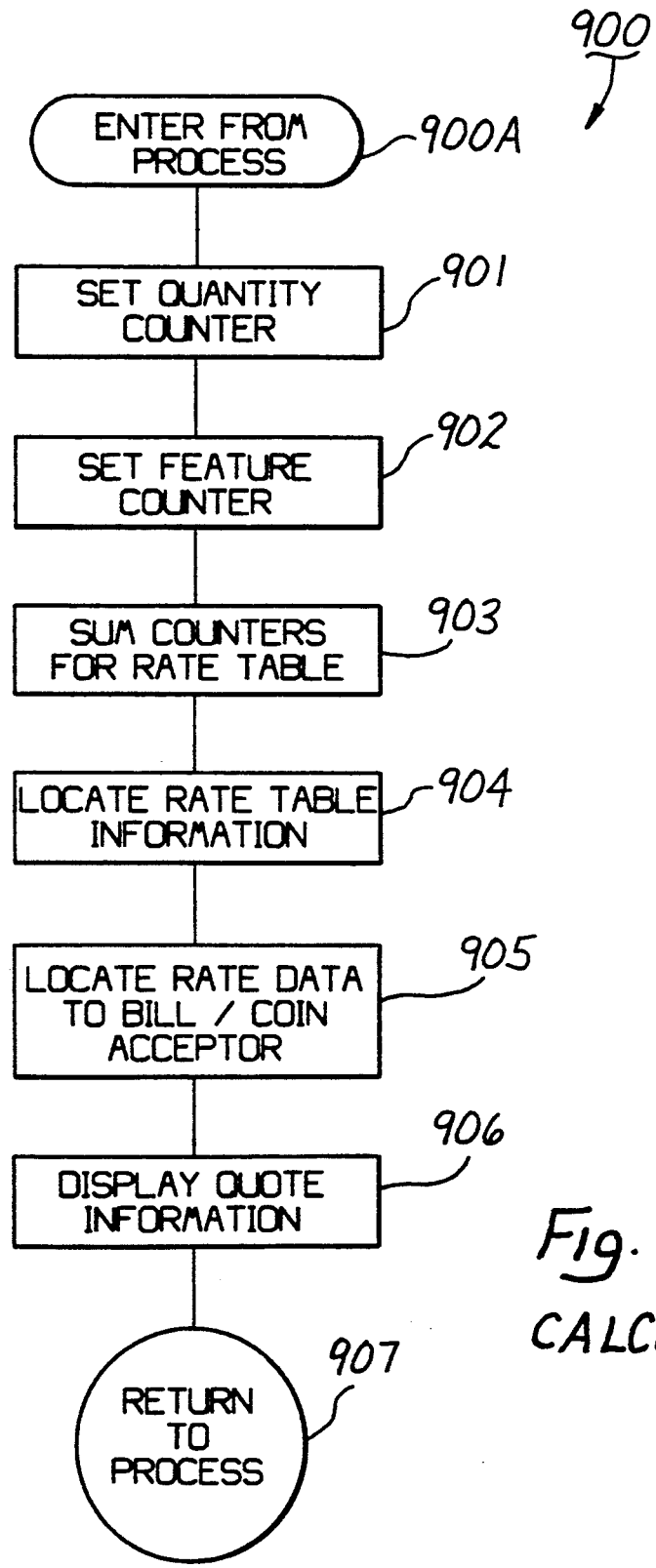
Figure 10:
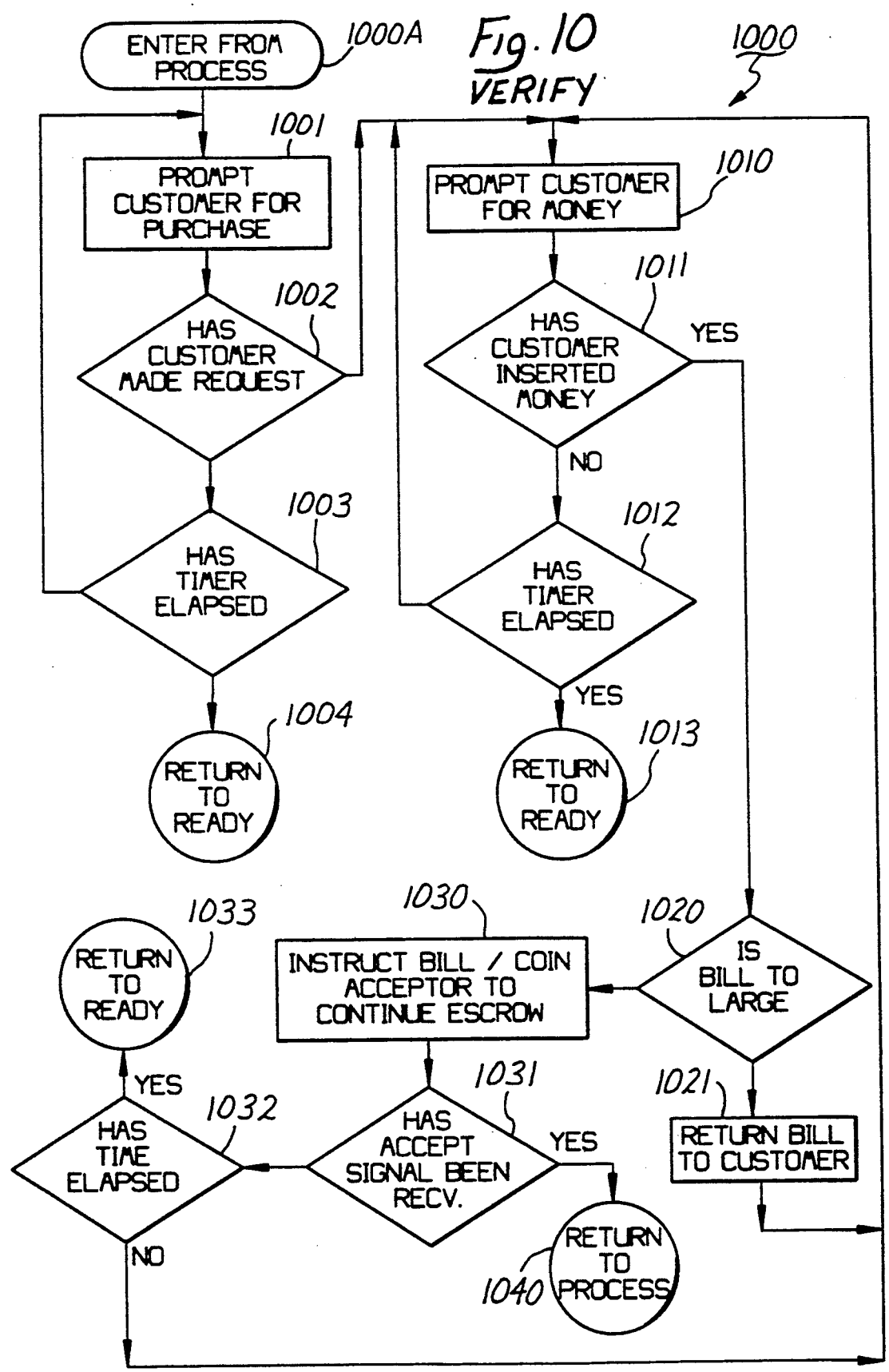

Again, after the customer has been, given a predetermined amount of time, the dispenser mechanism 22 prints and vends a postmaster notification sheet 280 as shown in FIG. 2G. After printing the notification sheet 280, the dispenser mechanism 22 prints and vends a change of address sheet 290 as shown in FIG. 2H. In this regard, the mechanism 22 prints and vends as many of the change of address sheets, such as sheet 290, as the customer has ordered.

Considering now the instruction sheet 260 in greater detail with reference to FIG. 2E, instruction sheet 260 is comprised of a heavy stock paper, which includes a set of microperforations, which define a set of: fold lines 261, 262, 263 and 264. Sheet 260 is generally rectangular in shape having a top edge 265, a bottom edge 266, and a pair of side edges 267 and 268. In the preferred form of the present invention, sheet 260 is a conventional 8 ½ inch by 11 inch sheet of paper. It should be understood, however, that other sized sheets may also be used with the card dispenser mechanism 22.

Fold lines 261 and 262 form one continuous line of perforations extending from edge 267 to edge 268. Similarly, fold lines 263 and 264 form another continuous line of perforations extending from edge 265 to edge 268. In this regard, the fold lines 261-264 subdivide the sheet 260 into four subsections 260A-D respectively.

Considering now subsection 260A in greater detail with reference to FIG. 2E, subsection 260A includes three groups of indicia thereon, shown generally at 260AI, 260A2 and 260A3. Indicia 260AI is in the form of a trademark which identifies the owner of the system. Indicia 260A2 is customized and provides the customer with detailed instructions for using each of the relevant subdivisions. Indicia 260A3 provides the customer with detailed instructions for separating or tearing the sheet 260 into individual cards. For example, when sheet 260 is separated by a customer following the direction specified by indicia 260A3, it is separated into its four component parts 260A-D. In this regard, after separation, the customer is provided with an instruction card 260A, a signature card 260B, a receipt card 260C and a blank card 260D.

Considering now subsection 260B is greater detail with reference to FIG. 2E, subsection 260B includes two groups of indicia thereon, shown generally at 260BI and 260B2. Indicia 260BI is substantially identical to indicia 260A1. Indicia 260B2 is in the form of notification information indicating where the customer is to sign the card 260B.

Considering now subsection 260C in greater detail with reference to FIG. 2E, subsection 260C includes two groups of indicia thereon, shown generally at 260C1 and at 260C2. Indicia 260C1 is substantially identical to indicia 260A1. Indicia 260C2 is in the form of an informative message reminding the customer of the need to change his or her voter's registration. Indicia 260C2 is also customized with the customer's name, and forms part of the customer receipt for the services and products provided through the change of address terminal 11A.

Considering now the receipt sheet 270 in greater detail with reference to FIG. 2F, the receipt sheet 270 is composed of a heavy stock paper, which is substantially similar to instruction sheet 260. In this regard, sheet 270 includes a set of microperforations which define a set of fold lines 271, 272, 273 and 274. Sheet 270 is generally rectangular in shape having a top edge 275, a bottom edge 276, and a pair of side edges 277 and 278. In the preferred form of the present invention, sheet 270 is a conventional 8½ inch×11 inch sheet of paper. It should be understood, however, that other size sheets could be used with the card dispenser mechanism 22.

Fold lines 271 and 272 form one continuous line of perforations extending from edge 277 to, edge 278. Similarly, fold lines 273 and 274 form another continuous line of perforations extending from edge 275 to edge 278. In this regard, the fold lines 271-274 subdivide the sheet 270 into four subsections 278A-D, respectively.

Considering now subsection 270A in greater detail with reference to FIG. 2F, subsection 270A includes four groups of indicia thereon, shown generally at 270A1, 270A2, 270A3 and 270A4. Indicia 270A1 is in the form of a trademark which is substantially identical to indicia 260A1. Indicia 270A2 is in the form of customized information indicating the address change of the customer;, showing both the "from address" and the "to address". Indicia 270A3 includes the effective date of the address change. Indicia 270A4 includes informative information for the customer, with regard to the change of address station 11A.

Considering now subsection 270B in greater detail with reference to FIG. 2F, subsection 270B includes two groupings of indicia thereon, shown generally at 270B1 and 270B2. Indicia 270B1 is substantially identical to indicia 270A1. Indicia 270B2 is in the form of notification information, indicating to the customer the various entities which have been notified of the customer's address change. In this regard, the entities listed by the indicia 270B2 are automatically notified via the terminal 11A as described herein.

Considering now subsection 270C in greater detail with reference to FIG. 2F, subsection 270C includes three groups of indicia thereon, shown generally at 270C1, 270C2, and 270C3. Indicia 270C1 is substantially identical to indicia 270A1. Indicia 270B2 provides a summary report of the change of address postcards, which the customer has ordered and includes a total cost for the customized postcards. Indicia 270C3 includes a summary report of all the charges which have been incurred by the customer in using the change of address terminal IIA. Indicia 270C4 includes a thank you note indicating whether or not the customer has paid for the services rendered by the terminal 11A via a credit card.

Considering now the notification sheet 280 in greater detail with reference to FIG. 2G, the notification sheet 280 is composed of a heavy stock paper which includes a set of microperforations defining a set of fold lines 281, 282, 283 and 284. Sheet 280 is generally rectangular in shape having a top edge 285, a bottom edge 286, and a pair of side edges 287 and 288, respectively. In the preferred form of the present invention, sheet 280 is a conventional 8½ inch by 11 inch sheet of heavy stock paper. It should be understood, however, that other size sheets could be used with the card dispenser mechanism 22.

Fold lines 281 and 282 form continuous lines of perforations extending from one edge 285 to 286. Similarly, fold lines 283 and 284 form continuous lines of perforations extending from edge 287 to 288. In this regard, the fold lines 281-284 subdivide the sheet 280 into four subsections 280A-D, respectively.

Considering now subsection 280A in greater detail with reference to FIG. 2G, subsection 280A includes indicia thereon shown generally at 280A1. Indicia 280A1 is in the form of a standard form used by the government postal service, for a mailer to indicate a change of address.

Considering now subsection 280D in greater detail with reference to FIG. 2G, subdivision 280D includes three groups of indicia thereon, shown generally at 280D1, 280D2 and 280D3. Indicia 280D1 is in the form of a government postal service postage stamp mark. Indicia 280D2 is in the form of a return address indicating postal service official business.

Indicia 280D3 is an address for the postal service for the area to which the customer is moving. In this regard, the customer can fold back the sheet along the perforation lines formed by 281 and 282, and can tear that portion of the sheet, i.e. thus removing subsections 280B and 280C from the sheet. The customer is then left with a postcard which can be conveniently folded along perforation line 284 and deposited in a receptacle at or near the terminal 11A, for pickup by the postal service.

Considering now the change of address sheet 290 in greater detail with reference to FIG. 2H, change of address sheet 290 is composed of a heavy stock paper, and includes a set of microperforations defining a set of fold lines 292, 293 and 294. Sheet 290 is generally rectangular shape, and has a top edge 295, bottom edge 296, and a pair of side edges 297 and 298. In the preferred form of the present invention, sheet 290 is a conventional 8½ inch by 11 inch sheet of heavy stock paper. It should be understood however that other sizes and weights of sheets may be used with the card dispenser mechanism 22.

Fold lines 291 and 292 form continuous lines of perforations extending from edge 297 to edge 298. Similarly, fold lines 293 and 294 form continuous lines of perforations extending from edge 295 to edge 298. In this regard, the fold lines 291-294 subdivide the sheet 290 into four subsections 290A-D respectively. Subdivisions 290A-D are substantially identical to one another, and only subsection 290A will now be described in greater detail.

Considering now subsection 290A in greater detail with reference to FIG. 2H, subsection 290A includes five groups of indicia thereon, shown generally at 290A1, 290A2, 290A3, 290A4 and 290A5. Indicia 290A1 is in the form of a trademark which identifies the owner of the system. Indicia 290A2 is customized, and provides the customer with the address information change showing the customer's old address and the customer's new address.

Indicia 290A3 shows the effective date of the address change. Indicia 290A4 is in the form of the government postal service stamp. Indicia 290A5 is in the form of a series of lines which the customer can manually fill in the name and address of a person or company, to which the customer desires to send an address change card. In this regard, a customer can fold the sheet 290 along the lines 291 and 292, and separate the sheet into two parts, one part being comprised of subdivisions 290A and 290B and the other section being comprised of subdivisions 290C and 290D. The two sections can be folded by the customer along respective fold lines 293 and 294 to separate the sections therealong. Thus, the customer is provided with four separate change of address postcards which may be mailed to various persons and entities for the purpose of notifying them of the customer's change of address.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A system for communicating change of mailing address information, comprising:
   a group of terminals for gathering change of mailing address information from individual members of the general public;
   subscriber computer means for supplying subscriber information
   each one of said terminals including memory means for storing subscriber information and user change of address information to facilitate notification of changes in mailing addresses;
   each one of said terminals further including input means for entering by individual members of the general public change of address information and for designating that the change of address information be supplied to selected subscribers;
   master service computer means for communicating with said terminals to receive said change of address information therefrom;
   said master service computer means including mail distribution memory means for storing subscriber information;
   said maser service computer means further including communication means for facilitating the transfer of information between said master computer means and said subscriber computer means and said group of terminals;
   said master service computer means having means for compiling said change of address information for user selected subscribers;
   said master service computer means further having means for supplying said compiled change of address information to said subscriber computer means;

each one of said terminals further including means for operating independently of said master computer means in a stand alone manner of operation; and each one of said terminals further including means for transferring periodically gathered change of mailing address information to said master computer means for use thereby.

2. A method for communicating change of mailing address information, comprising:

gathering customer change of mailing address information;

storing mail distributor information to facilitate notification of changes in mailing addresses;

compiling said customer information for selected mail distributors;

accepting payment by a given customer for preparing customized change of address postcards; and vending customized change of address postcards to said customer.

3. A method according to claim 2, further including generating summary report information based on the gathered customer information for use by selected ones of the mail distributors.

4. A system for communicating change of mailing address information, comprising:

a group of terminals for gathering change of mailing address information;

each one of said terminals including memory means for storing mail distributor information to facilitate notification of changes in mailing addresses;

master service computer means for communicating with said terminals to receive said change of address information therefrom;

said master service computer means having means for generating compiled change of address information for selected mail distributors;

said master service computer means having means for supplying said compiled change of address information to selected ones of the mail distributors; and wherein each one of said terminals includes processor means for calculating service quotations for notifying the selected mail distributors of a customer change of address information, and for calculating product quotations for printing customized change of address postcards.

5. A system for communicating change of mailing address information, comprising:

a group of terminals for gathering customer change of mailing address information;

each one of said terminals including memory means for storing mail distributor information to facilitate notification of changes in mailing addresses;

master service computer means for communicating with said terminals to receive said change of address information therefrom;

said master service computer means having means for generating compiled change o address information for selected mail distributors;

said master service computer means having means for supplying said change of address information to selected ones of the mail distributors; and wherein each one of said terminals further includes card dispensing means for vending change of address postcards.

6. A system according to claim 5 wherein aid service computer means includes:

disk drive memory means for storing input and output data;

an input keyboard for entering input data;

a monitor for displaying customer and mail distributor information;

a printer for printing output data; and wherein said service computer means includes means for interconnecting said service computer means with at least one subscriber computer means.

7. A system according to claim 5 wherein each one of said terminals include:

means for receiving and storing subscriber information for generating messages for use by a customer; and means for gathering basic customer information concerning a customer and the identification of the distributors of mail to be notified of a change in mailing address for said customer.

8. A system according to claim 7 wherein said means for receiving and storing subscriber information includes a modem and storage media means.

9. A system according to claim 7 wherein said means for gathering basic customer information includes video display means for displaying customer messages and an input keyboard for entering data from said customer;

means for determining the acceptance of an offered quotation for notifying selected distributors of mail of a customer change of address, said means for determining generating a signal indicative of the acceptance of said quotation;

means responsive to said signal for determining the receipt of the correct payment corresponding to said quotation for notifying the selected distributors of mail; and means for notifying the selected distributors of mail upon payment of the quotation amount by said customer.

10. A system according to claim 5 wherein said master computer includes means for generating a summary report based on said compiled information.

11. A system for communicating change of mailing address information, comprising:

a group of terminals for gathering customer change of mailing address information;

each one of said terminals including memory means for storing mail distributor information to facilitate notification of changes in mailing addresses;

master service computer means for communicating with said terminals to receive said change of address information therefrom;

said master service computer means having means for generating compiled change of address information for selected mail distributors;

said master service computer means having means for supplying said compiled change of address information to selected ones of the mail distributors;

wherein each one of said terminals includes:

means for receiving and storing subscriber information for generating messages for use by a customer; and means for gathering basic customer information concerning a customer and the identification of the distributors of mail to be notified of a change in mailing address for said customer;

wherein said means for gathering basic computer information includes means for determining service quotations for notifying mail distributors of change of mailing address information and for determining product qualifications for printing customized change of address postcards; means for determining customer acceptance of said quotations; and means for vending customized change of address postcards upon payment of the quotation amount by said customer.

12. A change of mailing address terminal, comprising:
   input means for gathering basic customer information, said information including change of address information and notification information;
   memory means for storing mail distributor information to facilitate notification f changes in mailing addresses; and
   means responsive to said basic customer information and to said distributor information for generating quotation information for notifying selected mail distributors of a customer change of address; and
   means for accepting payment by a given customer and postcard vending means for printing and vending customized change of address postcards.

13. A change of address terminal according to claim 12, wherein said input means includes a personal computer and a computer keyboard forming part of said personal computer.

14. A change of address terminal according to claim 13, wherein said personal computer includes a computer processor unit coupled in communication with said keyboard.

15. A change of address terminal according to claim 12, further including means for generating product quotation information, and means for causing customized documents to be printed.

16. A system for helping to control the distribution of mail comprising:
   a plurality of terminal means for gathering change of address information from individual members from the general public;
   each one of said plurality of terminal means including means for storing signals indicative of the change of address information gathered from said individual members of the general public;
   service computer means for receiving and distributing change of address information to help facilitate the distribution of mail to certain ones of said individual members of the general public;
   each one of said plurality of terminal means including means for operating its terminal independently of said service computer means;
   each one of said plurality of terminal means further including means for transferring periodically to the service computer means the change of address information gathered during a predetermined time interval;
   wherein each one of said plurality of terminal means further includes:
   payment acceptance means for preparing customized change of address postcards for distribution by an individual member of the public; and
   means responsive to said payment acceptance means for vending customized change of address postcards to said individual member of the public.

17. A system according to claim 16, wherein said service computer means includes means for storing and compiling change of address information for distribution purposes.

18. A system according to claim 17, further comprising:
   subscriber computer means for distributing subscriber mail to a group of recipients, wherein certain individual ones of the recipients are individual members from the general public;
   said service computer means includes means for sorting and compiling change of address information for said members who indicate they receive certain subscriber mail; and
   said service computer means including means for transferring periodically the compiled change of address information to aid subscriber computer means.

19. A system for helping to control the distribution of mail according to claim 18, wherein said service computer means includes postal service computer means for communicating change of address information to a plurality of remotely located mail distribution computer means and said subscriber computer means.

20. A system according to claim 19, wherein said service computer means further includes master computer means for communicating with said plurality of terminal means.

* * * * *